United States Patent
Liu et al.

(10) Patent No.: US 8,672,475 B2
(45) Date of Patent: Mar. 18, 2014

(54) SILICONE HYDROGEL CONTACT LENSES AND METHODS OF MAKING SILICONE HYDROGEL CONTACT LENSES

(75) Inventors: Yuwen Liu, Dublin, CA (US); Yuan Ji, San Jose, CA (US); David Morsley, Southampton (GB); Charles Francis, Pleasanton, CA (US); Arthur Back, Danville, CA (US)

(73) Assignee: Coopervision International Holding Company, LLC, St. Michael (BB)

( * ) Notice: Subject to any disclaimer, the term of this patent is extended or adjusted under 35 U.S.C. 154(b) by 274 days.

(21) Appl. No.: 12/894,941

(22) Filed: Sep. 30, 2010

(65) Prior Publication Data

US 2011/0085128 A1 Apr. 14, 2011

Related U.S. Application Data

(60) Provisional application No. 61/278,072, filed on Oct. 1, 2009.

(51) Int. Cl.
*G02C 7/04* (2006.01)
*B29D 11/00* (2006.01)

(52) U.S. Cl.
CPC .......... *G02C 7/049* (2013.01); *B29D 11/00067* (2013.01)
USPC ................................ 351/159.33; 351/159.04

(58) Field of Classification Search
CPC ...................................................... G02C 7/049
USPC .............. 351/159.35, 159.15, 159.11, 159.12
See application file for complete search history.

(56) References Cited

U.S. PATENT DOCUMENTS

| | | | |
|---|---|---|---|
| 2,393,266 A | 1/1946 | Riddell | |
| 2,989,894 A | 6/1961 | Gordon | |
| 3,228,741 A | 1/1966 | Becker | |
| 3,246,941 A | 4/1966 | Moss | |
| 3,431,046 A | 3/1969 | Conrad et al. | |
| 3,594,074 A | 7/1971 | Rosen | |
| 3,808,178 A | 4/1974 | Gaylord | |
| 3,907,851 A | 9/1975 | Boersma et al. | |
| 4,099,859 A | 7/1978 | Merrill | |
| 4,120,570 A | 10/1978 | Gaylord | |
| 4,121,896 A | 10/1978 | Shepherd | |

(Continued)

FOREIGN PATENT DOCUMENTS

| | | |
|---|---|---|
| CN | 1734314 | 2/2006 |
| DE | 2546692 | 4/1977 |

(Continued)

OTHER PUBLICATIONS

"Diameter." Dictionary.com, n.d. Web. Aug. 17, 2012. <http://dictionary.reference.com/browse/diameter?s=t>.*

(Continued)

*Primary Examiner* — Zachary Wilkes
(74) *Attorney, Agent, or Firm* — Stout, Uxa, Buyan & Mullins; Frank J. Uxa

(57) ABSTRACT

Silicone hydrogel contact lenses, when hydrated, have a plurality of depressions on one or more of the lens surfaces. The depressions have a depth less than 1 micrometer, or less than 100 nanometers. The silicone hydrogel contact lenses have not been subject to treatment with plasma. Methods of manufacturing the silicone hydrogel contact lenses are also disclosed.

19 Claims, 16 Drawing Sheets

(56) References Cited

U.S. PATENT DOCUMENTS

| | | |
|---|---|---|
| 4,136,250 A | 1/1979 | Mueller et al. |
| 4,139,513 A | 2/1979 | Tanaka et al. |
| 4,153,641 A | 5/1979 | Deichert et al. |
| 4,182,822 A | 1/1980 | Chang |
| 4,208,365 A | 6/1980 | LeFevre |
| 4,217,038 A | 8/1980 | Letter et al. |
| 4,246,389 A | 1/1981 | LeBoeuf |
| 4,259,467 A | 3/1981 | Keogh et al. |
| 4,260,725 A | 4/1981 | Keogh et al. |
| 4,293,397 A | 10/1981 | Sata et al. |
| 4,353,849 A | 10/1982 | Lewison |
| 4,401,371 A | 8/1983 | Neefe |
| 4,440,918 A | 4/1984 | Rice et al. |
| 4,487,905 A | 12/1984 | Mitchell |
| 4,605,712 A | 8/1986 | Mueller et al. |
| 4,640,594 A | 2/1987 | Berger |
| 4,649,184 A | 3/1987 | Yoshikawa et al. |
| 4,703,097 A | 10/1987 | Wingler et al. |
| 4,711,943 A | 12/1987 | Harvey, III |
| 4,740,533 A | 4/1988 | Su et al. |
| 4,879,072 A | 11/1989 | Bourset et al. |
| 4,890,911 A | 1/1990 | Sulc et al. |
| 4,954,586 A | 9/1990 | Toyoshima et al. |
| 5,009,497 A | 4/1991 | Cohen |
| 5,010,141 A | 4/1991 | Mueller |
| 5,023,305 A | 6/1991 | Onozuka et al. |
| 5,034,461 A | 7/1991 | Lai et al. |
| 5,070,169 A | 12/1991 | Robertson et al. |
| 5,079,319 A | 1/1992 | Mueller |
| 5,104,213 A | 4/1992 | Wolfson |
| 5,158,717 A | 10/1992 | Lai |
| 5,166,710 A | 11/1992 | Höfer et al. |
| 5,258,490 A | 11/1993 | Chang |
| 5,260,000 A | 11/1993 | Nandu et al. |
| 5,274,008 A | 12/1993 | Lai |
| 5,312,690 A | 5/1994 | Fukuda et al. |
| 5,314,960 A | 5/1994 | Spinelli et al. |
| 5,321,108 A | 6/1994 | Kunzler et al. |
| 5,347,326 A | 9/1994 | Volk |
| 5,352,714 A | 10/1994 | Lai et al. |
| 5,358,995 A | 10/1994 | Lai et al. |
| 5,387,632 A | 2/1995 | Lai et al. |
| 5,451,617 A | 9/1995 | Lai et al. |
| 5,483,304 A | 1/1996 | Porat |
| 5,486,579 A | 1/1996 | Lai et al. |
| 5,496,871 A | 3/1996 | Lai et al. |
| 5,539,016 A | 7/1996 | Kunzler et al. |
| 5,598,233 A | 1/1997 | Haralambopoulos et al. |
| 5,641,437 A | 6/1997 | Williams et al. |
| 5,760,100 A | 6/1998 | Nicolson et al. |
| 5,776,999 A | 7/1998 | Nicolson et al. |
| 5,789,461 A | 8/1998 | Nicolson et al. |
| 5,807,944 A | 9/1998 | Hirt et al. |
| 5,817,924 A | 10/1998 | Tuomela et al. |
| 5,849,811 A | 12/1998 | Nicolson et al. |
| 5,945,498 A | 8/1999 | Hopken et al. |
| 5,959,117 A | 9/1999 | Ozark et al. |
| 5,962,548 A | 10/1999 | Vanderlaan et al. |
| 5,965,631 A | 10/1999 | Nicolson et al. |
| 5,969,076 A | 10/1999 | Lai et al. |
| 5,981,675 A | 11/1999 | Valint, Jr. et al. |
| 5,998,498 A | 12/1999 | Vanderlaan et al. |
| 6,020,445 A | 2/2000 | Vanderlaan et al. |
| 6,043,328 A | 3/2000 | Domschke et al. |
| 6,310,116 B1 | 10/2001 | Yasuda et al. |
| 6,348,507 B1 | 2/2002 | Heiler et al. |
| 6,359,024 B2 | 3/2002 | Lai |
| 6,367,929 B1 | 4/2002 | Maiden et al. |
| 6,436,481 B1 | 8/2002 | Chabrecek et al. |
| 6,568,807 B2 * | 5/2003 | Rogers et al. ............ 351/159.28 |
| 6,638,991 B2 | 10/2003 | Baba et al. |
| 6,649,742 B1 | 11/2003 | Better et al. |
| 6,652,095 B2 | 11/2003 | Tung |
| 6,689,480 B2 | 2/2004 | Shimoyama et al. |
| 6,727,336 B1 | 4/2004 | Ito et al. |
| 6,779,888 B2 | 8/2004 | Marmo |
| 6,846,892 B2 * | 1/2005 | Kindt-Larsen et al. ....... 526/320 |
| 6,849,671 B2 | 2/2005 | Steffen et al. |
| 6,861,123 B2 | 3/2005 | Turner et al. |
| 6,867,245 B2 | 3/2005 | Iwata et al. |
| 6,886,936 B2 | 5/2005 | Marmo et al. |
| 6,891,010 B2 | 5/2005 | Kunzler et al. |
| 6,902,812 B2 | 6/2005 | Valint, Jr. et al. |
| 6,921,802 B2 | 7/2005 | Kunzler et al. |
| 6,940,580 B2 | 9/2005 | Winterton et al. |
| 6,943,203 B2 | 9/2005 | Vanderlaan et al. |
| 6,951,894 B1 | 10/2005 | Nicolson et al. |
| 6,992,118 B2 | 1/2006 | Sulc et al. |
| 7,319,133 B2 | 1/2008 | Brame et al. |
| 7,320,587 B2 | 1/2008 | Goodenough et al. |
| 7,360,890 B2 | 4/2008 | Back |
| 7,422,710 B2 | 9/2008 | Turner et al. |
| 7,426,993 B2 | 9/2008 | Coldrey et al. |
| 7,695,775 B2 * | 4/2010 | Kobrin et al. ................. 427/558 |
| 7,731,873 B2 | 6/2010 | Darnton et al. |
| 7,750,079 B2 | 7/2010 | Almond |
| 7,785,092 B2 | 8/2010 | Rogers |
| 7,799,249 B2 | 9/2010 | Goodenough et al. |
| 2002/0016383 A1 | 2/2002 | Iwata et al. |
| 2002/0057416 A1 | 5/2002 | Streibig |
| 2002/0107324 A1 | 8/2002 | Vanderlaan et al. |
| 2002/0120084 A1 | 8/2002 | Valint et al. |
| 2002/0137811 A1 | 9/2002 | Turek et al. |
| 2003/0008154 A1 | 1/2003 | Aguado et al. |
| 2003/0039748 A1 | 2/2003 | Valint et al. |
| 2003/0095232 A1 | 5/2003 | Mitsui |
| 2003/0109390 A1 | 6/2003 | Salpekar et al. |
| 2003/0109637 A1 | 6/2003 | Kunzler et al. |
| 2003/0125498 A1 | 7/2003 | McCabe et al. |
| 2003/0134132 A1 | 7/2003 | Winterton et al. |
| 2003/0162862 A1 | 8/2003 | McCabe et al. |
| 2004/0039077 A1 | 2/2004 | Baba et al. |
| 2005/0053642 A1 | 3/2005 | Ulbricht et al. |
| 2005/0154080 A1 | 7/2005 | McCabe et al. |
| 2005/0165187 A1 | 7/2005 | Kunzler et al. |
| 2005/0179862 A1 | 8/2005 | Steffen et al. |
| 2005/0228065 A1 | 10/2005 | Nicolson et al. |
| 2006/0001184 A1 | 1/2006 | Phelan |
| 2006/0007391 A1 | 1/2006 | McCabe et al. |
| 2006/0012751 A1 | 1/2006 | Rosenzweig et al. |
| 2006/0072069 A1 | 4/2006 | Laredo et al. |
| 2006/0074208 A1 | 4/2006 | Laredo |
| 2007/0066706 A1 | 3/2007 | Manesis et al. |
| 2007/0155851 A1 * | 7/2007 | Alli et al. ...................... 523/106 |
| 2007/0291223 A1 | 12/2007 | Chen et al. |
| 2007/0296914 A1 | 12/2007 | Hong et al. |
| 2008/0048350 A1 | 2/2008 | Chen et al. |
| 2008/0067702 A1 | 3/2008 | Yao et al. |
| 2008/0143956 A1 | 6/2008 | Sharma et al. |
| 2008/0269429 A1 | 10/2008 | Arkles et al. |
| 2009/0234089 A1 | 9/2009 | Ueyama et al. |
| 2009/0303432 A1 * | 12/2009 | Suzuki et al. ............. 351/160 R |

FOREIGN PATENT DOCUMENTS

| | | |
|---|---|---|
| EP | 0 330 616 | 6/1991 |
| EP | 0 330 617 | 7/1991 |
| EP | 0 908 476 | 4/1999 |
| EP | 0 908 744 | 4/1999 |
| EP | 0947872 A1 | 10/1999 |
| EP | 0952476 A1 | 10/1999 |
| EP | 1014152 A1 | 6/2000 |
| GB | 1 399 301 | 7/1975 |
| JP | 60-3342 | 1/1985 |
| JP | A 63-297411 | 12/1988 |
| JP | A 5-19214 | 1/1993 |
| JP | A 6-170857 | 6/1994 |
| JP | A 8-25378 | 1/1996 |
| JP | B2 2503028 | 3/1996 |
| JP | A 8-245737 | 9/1996 |
| JP | A 8-245790 | 9/1996 |
| JP | A 8-304746 | 11/1996 |
| JP | 11-320699 | 11/1999 |
| JP | 2008-202060 A | 9/2008 |

(56) References Cited

FOREIGN PATENT DOCUMENTS

| WO | WO 91/04283 | | 4/1991 | |
|---|---|---|---|---|
| WO | WO 93/05085 | | 3/1993 | |
| WO | WO/2007/146299 | A2 | 12/2007 | |
| WO | WO 2008/087859 | * | 7/2008 | ............... G02C 7/04 |
| WO | WO/2008/131268 | A2 | 10/2008 | |
| WO | WO/2009/091728 | A2 | 7/2009 | |
| WO | WO/2009/091733 | A2 | 7/2009 | |

OTHER PUBLICATIONS

U.S. Appl. No. 11/201,410, filed Aug. 9, 2005.
D.A. Brandreth: "Dynamic contact angles and contact angle hysteresis", Journal of Colloid and Interface Science, vol. 62, 1977, pp. 205-212.
R. Knapikowski, M. Kudra: "Kontaktwinkelmessungen nach dem Wilhelmy-Prinzip-Ein statistischer Ansatz zur Fehlerbeurteilung", Chem. Technik, vol. 45, 1993, pp. 179-185. (See English abstract for relevant passage.)
M. Chhabra et al., "A single-lens polarographic measurement of oxygen permeability (DK) for hypertransmissible soft contact lenses", Biomaterials 28 (2007) pp. 4331-4342.
Holden et al., "Critical Oxygen Levels to Avoid Corneal Edema for Daily and Extended Wear Contact Lenses", Invest. Ophthalmol. Vis. Sci., 25:1161-1167 (1984).
Terry R.L. et al., "CCLRU Standards for Success of Daily and Extended Wear Contact Lenses", Optom. Vis. Sci. 70(3):234-243, 1993.
Jones et al., "Silicone hydrogel contact lenses Part 1 Evolution and current status", pp. 26-32, Sep. 20, 2002.
Grant et al., "The Oxygen Transmissibility Profile of Siloxane Hydrogel Contact Lenses", Poster presentation obtained from the internet in Oct. 2005. Applicant is unaware of the publication date of the poster, but according to document properties of the electronic poster, it was created and last modified in 2002.
Steffen et al., "Finding the Comfort Zone With the Newest Silicone Hydrogel Technology", *Contact Lens Spectrum*, obtained from the internet in Oct. 2005. Applicant is unaware of the publication date of the article.
Nicolson et al., "Soft contact lens polymers: an evolution", *Biomaterials* 22:3273-3283, 2001.
Baush & Lomb® PureVision™ Contact Lenses, Product information page from internet—Vision Care Home Page—page dated Apr. 21, 1999 (internet address unknown).
"Ciba promotes merits of new 30-night lens", Article. Applicant is unaware of publisher and date.
Grobe III, et al., "Surface chemical structure for soft contact lenses as a function of polymer processing" *Journal of Biomedical Materials Research*, vol. 32, pp. 45-54 (1996).
International Search Report dated Nov. 5, 2007, in PCT application No. PCT/US05/30491.
USPTO Office Action dated Mar. 30, 2010 in U.S. Appl. No. 11/213,437, filed Aug. 26, 2005.
USPTO Office Action dated Aug. 31, 2009 in U.S. Appl. No. 11/213,437, filed Aug. 26, 2005.
USPTO Office Action dated Dec. 23, 2008 in U.S. Appl. No. 11/213,437, filed Aug. 26, 2005.
USPTO Office Action dated Mar. 14, 2008 in U.S. Appl. No. 11/213,437, filed Aug. 26, 2005.
USPTO Office Action dated Jul. 9, 2010 in U.S. Appl. No. 11/525,106, filed Sep. 20, 2006.
USPTO Office Action dated May 4, 2010 in U.S. Appl. No. 11/525,106, filed Sep. 20, 2006.
USPTO Office Action dated Sep. 1, 2009 in U.S. Appl. No. 11/525,106, filed Sep. 20, 2006.
USPTO Office communication dated Jun. 9, 2008 in U.S. Appl. No. 11/761,272, filed Jun. 11, 2007.
Amendment filed in U.S. Appl. No. 11/761,272 on Oct. 9, 2008 and attached Declaration Under 37 CFR 1.132.
USPTO Office communication dated Dec. 23, 2008 in U.S. Appl. No. 11/761,272.
Amendment After Final filed with the USPTO on Feb. 20, 2009 in U.S. Appl. No. 11/761,272.
USPTO Office communication dated Mar. 16, 2009 in U.S. Appl. No. 11/761,272.
Supplemental Amendment After Final filed with the USPTO on Mar. 19, 2009 in U.S. Appl. No. 11/761,272.
USPTO Notice of Allowance, Examiner-Initiated Interview Summary and Examiner's Amendment mailed Apr. 6, 2009 in U.S. Appl. No. 11/761,272.
USPTO Office communication dated Aug. 6, 2008 in U.S. Appl. No. 11/761,324, filed Jun. 11, 2007.
Amendment filed with the USPTO on Oct. 16, 2008 in U.S. Appl. No. 11/761,324.
USPTO Office communication dated Nov. 7, 2008 in U.S. Appl. No. 11/761,324.
Amendment filed with the USPTO on Nov. 26, 2008 in U.S. Appl. No. 11/761,324.
USPTO Office communication dated Dec. 8, 2008 in U.S. Appl. No. 11/761,324.
Amendment After Final filed with the USPTO on Dec. 23, 2008 in U.S. Appl. No. 11/761,324.
USPTO Office communication dated Jan. 9, 2009 in U.S. Appl. No. 11/761,324.
Amendment filed with the USPTO on Jan. 30, 2009 in U.S. Appl. No. 11/761,324.
USPTO Office communication dated Mar. 5, 2009 in U.S. Appl. No. 11/761,324.
Amendment After Final filed with the USPTO on Mar. 19, 2009 in U.S. Appl. No. 11/761,324.
USPTO Office communication dated Mar. 25, 2009 in U.S. Appl. No. 11/761,324.
USPTO Office communication dated Apr. 21, 2008 in U.S. Appl. No. 11/761,332, filed Jun. 11, 2007.
Amendment filed with the USPTO on Oct. 14, 2008 in U.S. Appl. No. 11/761,332.
USPTO Office communication dated Jan. 8, 2009 in U.S. Appl. No. 11/761,332.
PCT International Search Report and Written Opinion dated Aug. 2, 2011 in related PCT Application No. PCT/US2010/050879.

* cited by examiner

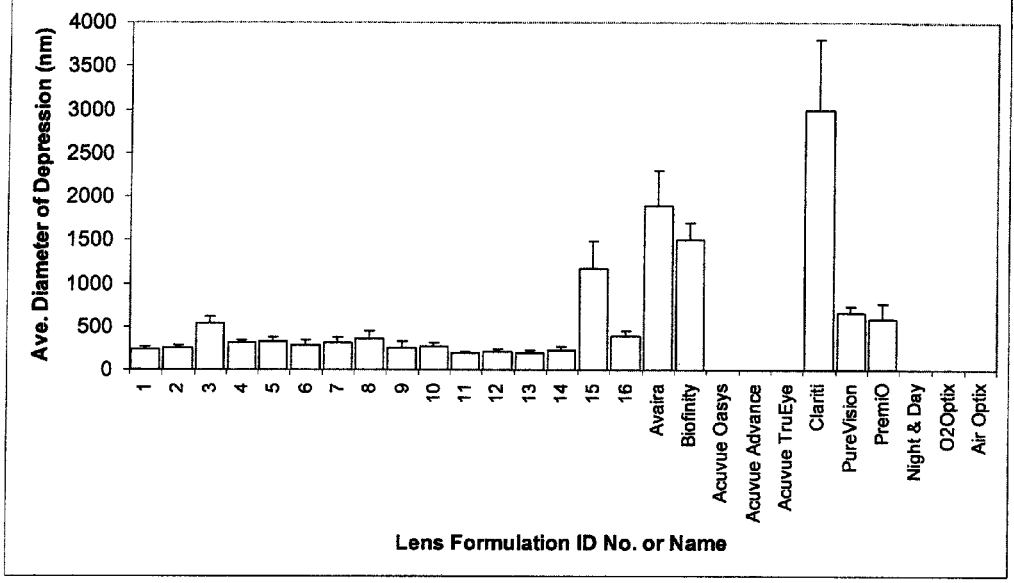
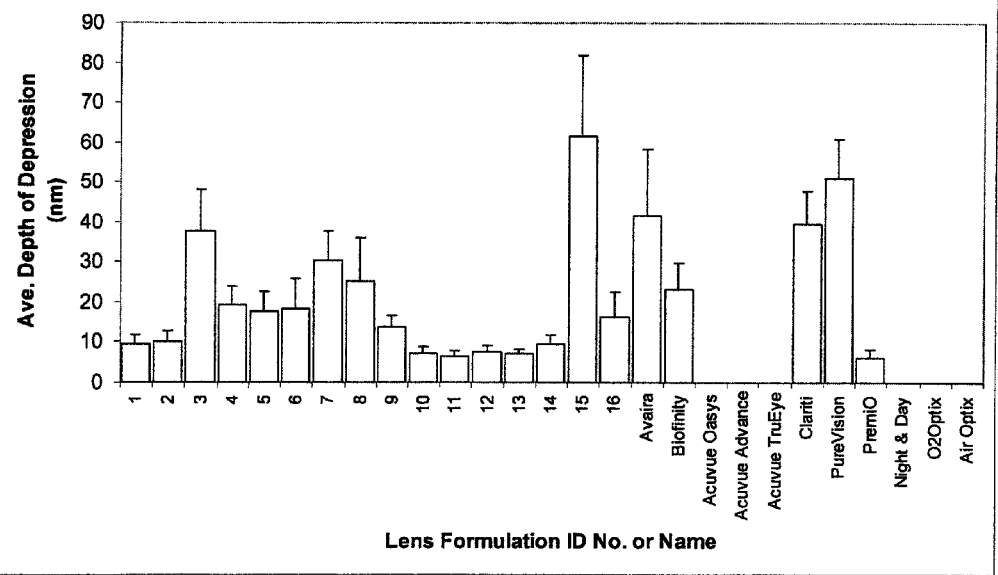

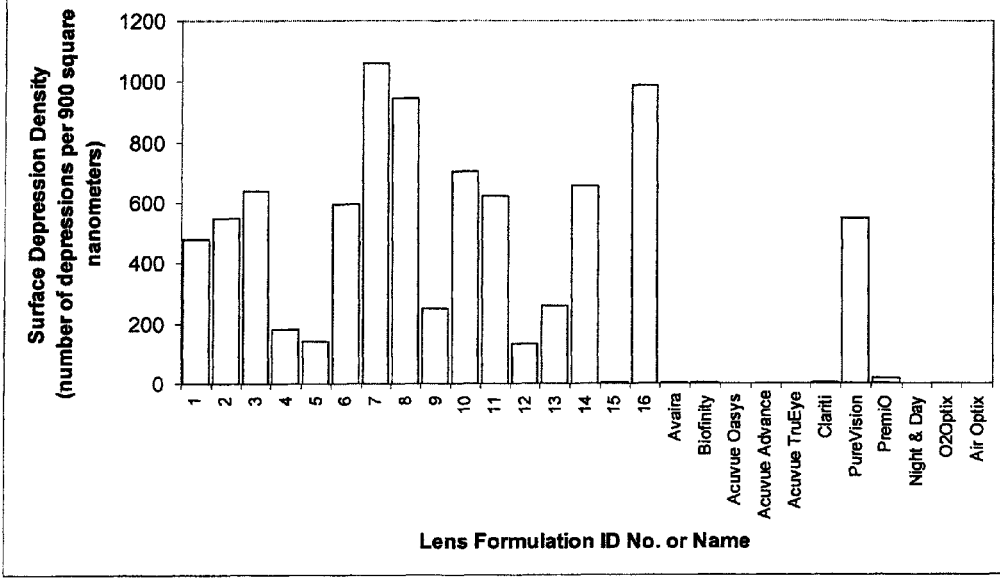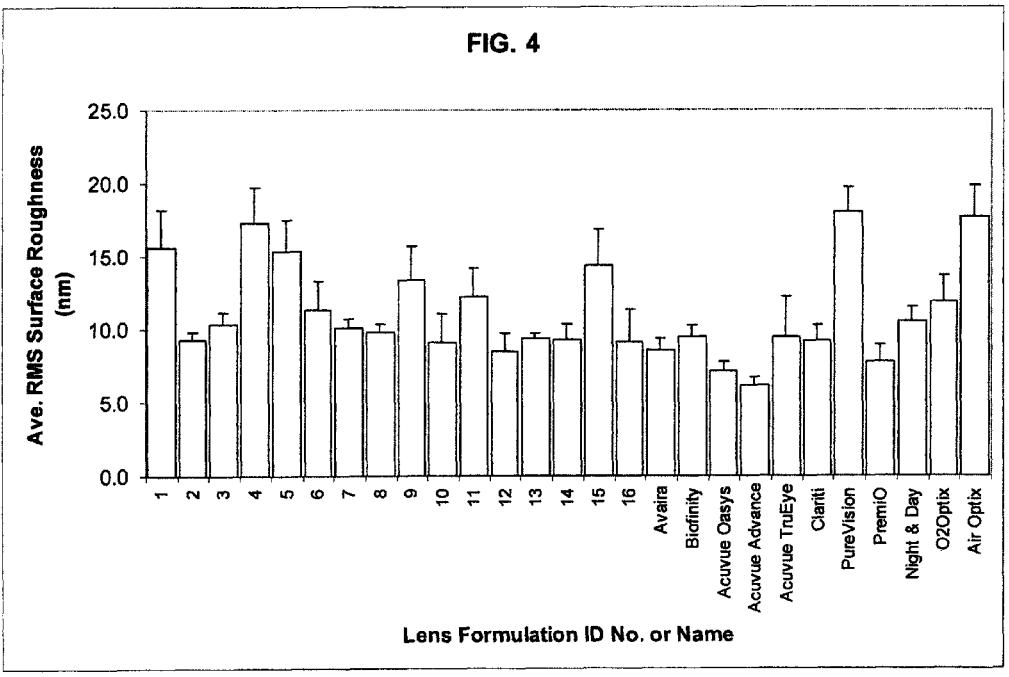

FIG. 9
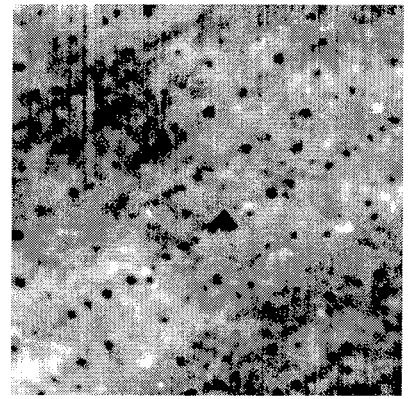
Lens Formulation 14 (10μm×10μm)
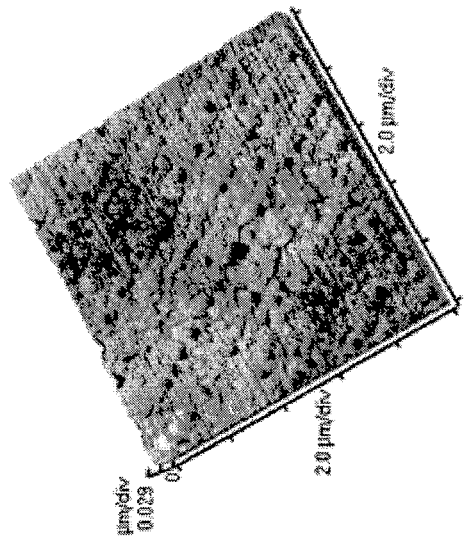
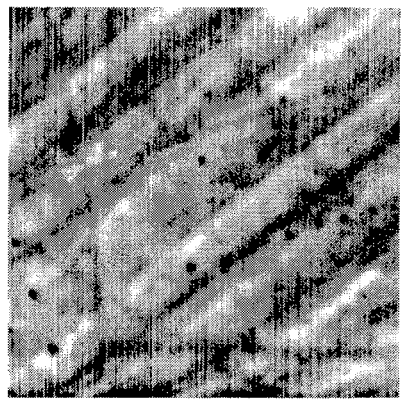
Lens Formulation 13 (10μm×10μm)
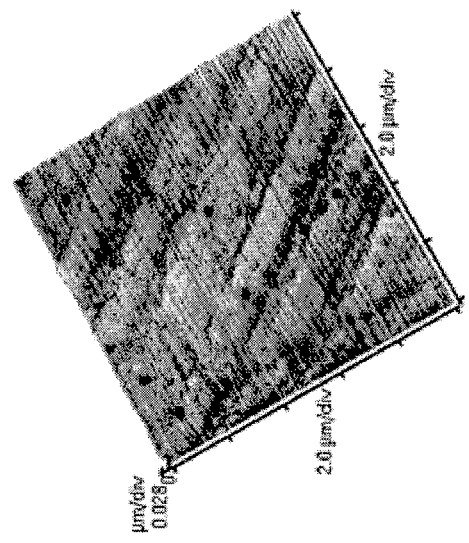

FIG. 10
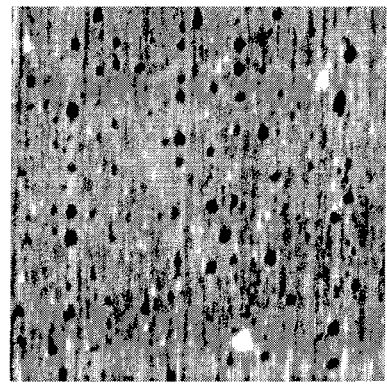
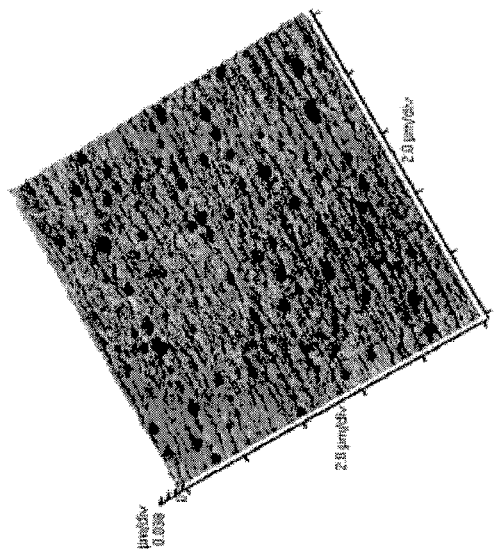
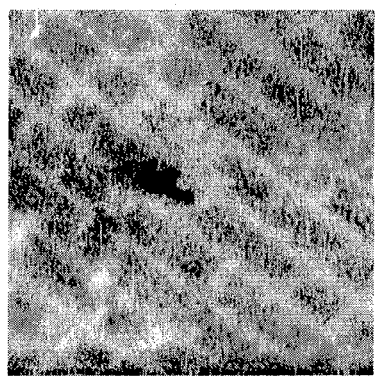
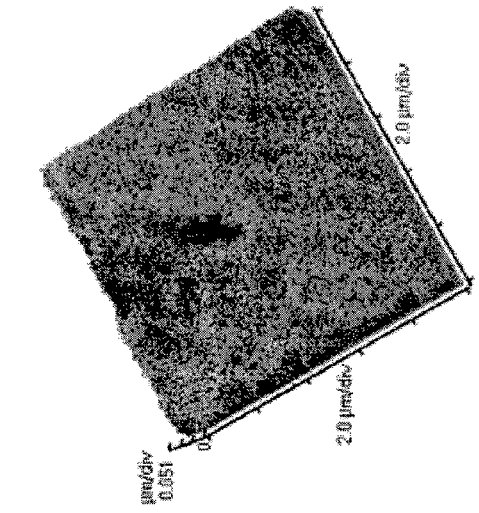

FIG. 13
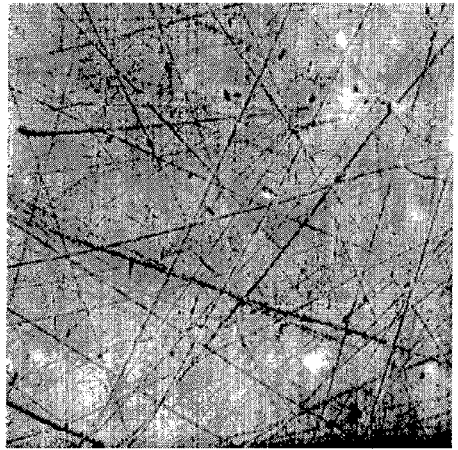
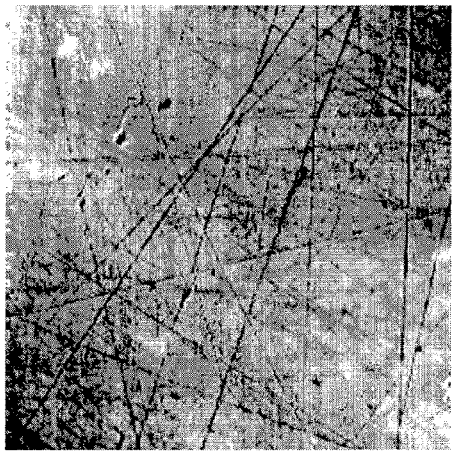
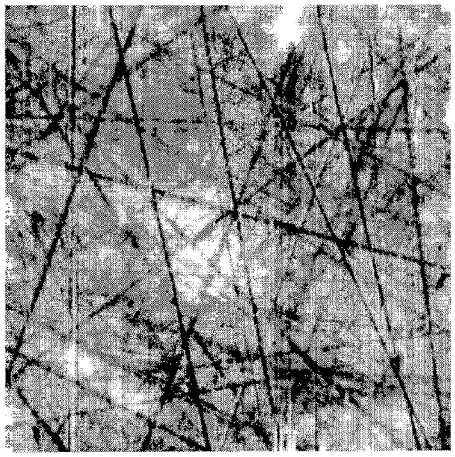
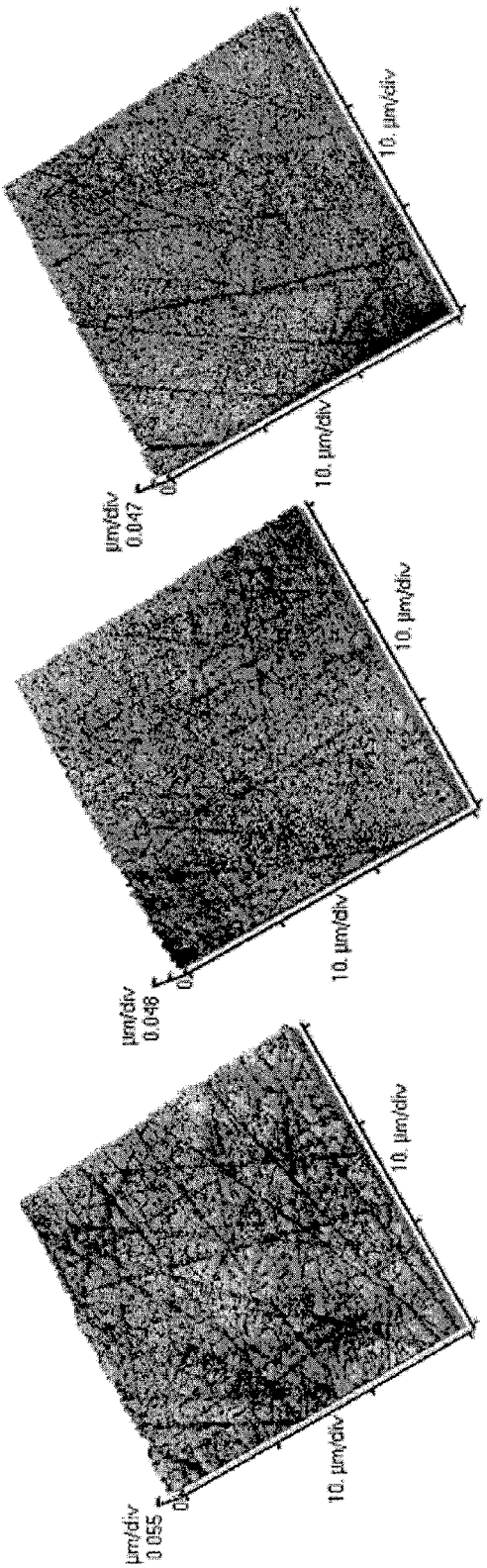

FIG. 15
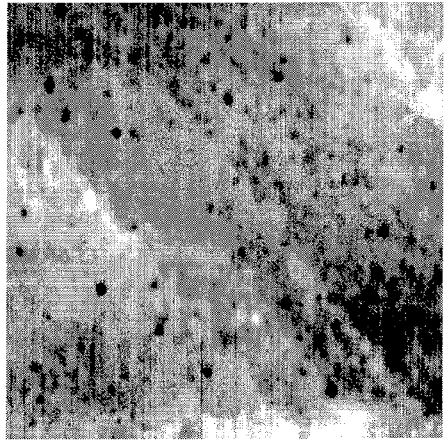
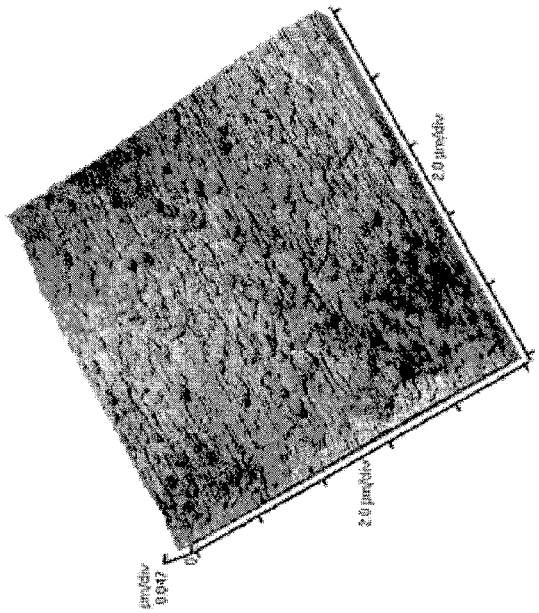
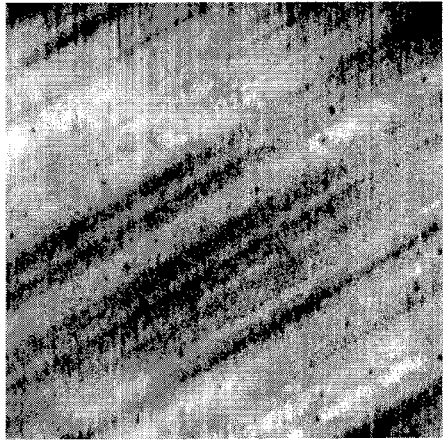
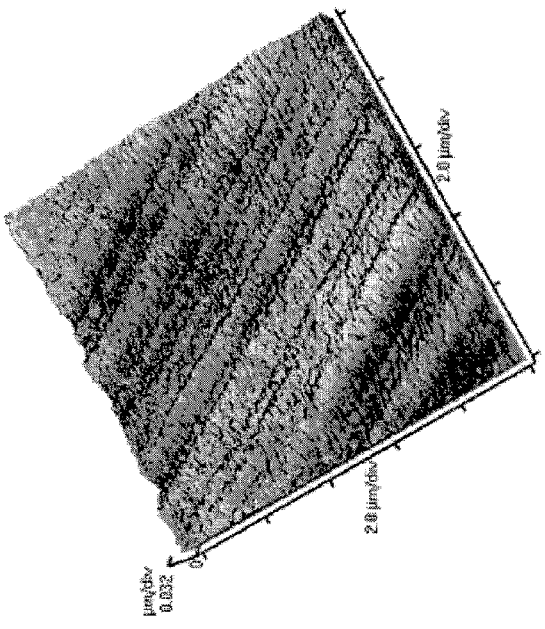

FIG. 16
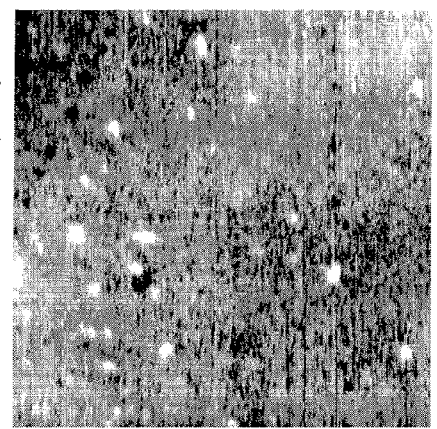
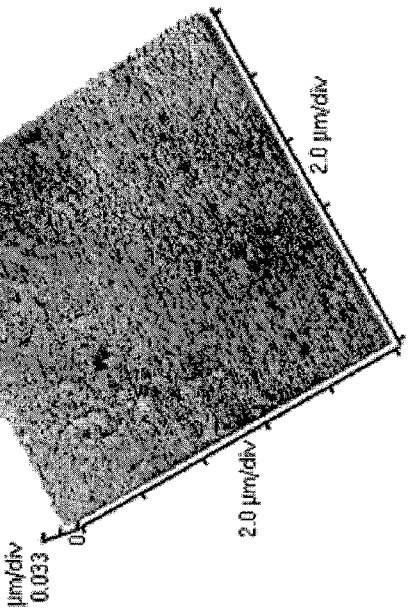
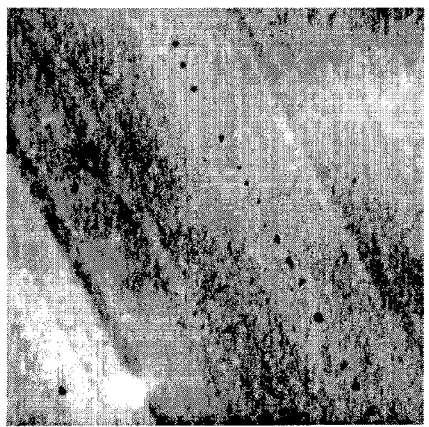
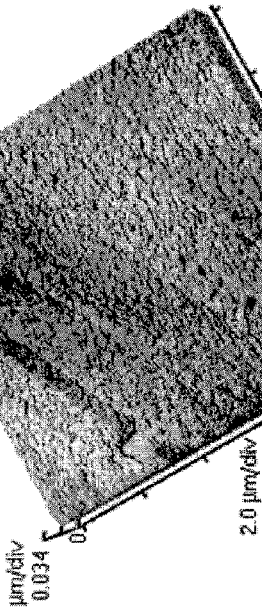

SILICONE HYDROGEL CONTACT LENSES AND METHODS OF MAKING SILICONE HYDROGEL CONTACT LENSES

CROSS-REFERENCE TO RELATED APPLICATIONS

The present application claims the benefit of U.S. Provisional Application Ser. No. 61/278,072, filed Oct. 1, 2009, the disclosures of which is incorporated in its entirety herein by reference.

FIELD

The present invention relates to contact lenses and methods of manufacturing contact lenses, for example silicone hydrogel contact lenses and methods of manufacturing silicone hydrogel contact lenses.

BACKGROUND

Silicone hydrogel contact lenses have become an important tool in vision correction. A number of techniques have been employed to produce silicone hydrogel contact lenses with hydrophilic surfaces. For example, some silicone hydrogel contact lenses are surface treated with plasma, some silicone hydrogel contact lenses include a hydrophilic polymeric wetting agent in the polymerizable composition used to produce the silicone hydrogel contact lenses, and some silicone hydrogel contact lenses are cast in contact lens molds formed of a polar resin.

Sharma et al U.S. Patent Application Publication US 2008/0143956 discloses silicone hydrogel contact lenses in which a surface of the lens is wrinkled and includes raised ridges extending upward from the lens surface. The wrinkled surface provided on the posterior surface of the lens is said to facilitate fluid exchange between the lens and the cornea of the lens wearer's eye. The lens is a cast molded lens, which is formed before the wrinkled surface is provided to the lens. The formed or cast molded contact lens is initially provided with a modified surface layer, for example, a silicate surface layer, and subsequently this modified surface becomes the wrinkled surface. For example, the surface may be modified by treating it with plasma or other energy. After forming the modified surface layer, the lens is swelled with a polymerizable swelling agent, for example, including ethylenic unsaturation, such that the swelling agent is polymerizable by free radical polymerization. Depending on the amount of swelling, the modified surface layer, for example, the silicate layer, becomes wrinkled to a varying degree. Polymerization of the polymerizable swelling agent serves to stabilize the wrinkled modified surface layer. This multi-step process, particularly surface modification and stabilizing processing after lens formation, is relatively complex and difficult to control, as well as adding to the cost of manufacturing silicone hydrogel contact lenses.

There continues to be a need for new contact lenses having desirable properties, such as surface wettability, and for new methods, for example, cost effective methods, of manufacturing contact lenses with such desirable properties.

SUMMARY

New silicone hydrogel contact lenses and methods of manufacturing silicone hydrogel contact lenses have been discovered. The present silicone hydrogel contact lenses have contact lens bodies with surfaces having novel surface characteristics. Among other things, the anterior lens surface and the posterior lens surface are hydrophilic without having to be subjected to plasma treatment and/or to treatment with a polymerizable swelling agent after the lens body is formed. The present methods straightforwardly manufacture the present contact lenses without subjecting the contact lenses to plasma treatment and/or to treatment with a polymerizable swelling agent after the lens body is formed.

In one broad aspect, an example of the present silicone hydrogel contact lenses comprises a lens body comprising an anterior surface and a posterior surface, wherein after hydration in water or an aqueous solution, at least one of the anterior surface and the posterior surface of the lens body when wet comprises a plurality of depressions with an average diameter between about 150 nanometers and less than 1500 nanometers, and wherein the lens body has not been subjected to a form of plasma treatment, the lens body is not treated with a polymerizable swelling agent after the lens body is formed, or both.

An additional example of the present silicone hydrogel contact lenses comprises a non-plasma treated silicone hydrogel lens body comprising an anterior surface and a posterior surface, at least one of the surfaces comprising a plurality of depressions, the density of depressions being from about 100 depressions per 900 square micrometers to about 1200 depressions per 900 square micrometers.

In one embodiment, the plurality of depressions have an average diameter between about 130 nanometers and less than about 630 nanometers, or the plurality of depressions have an average diameter between about 150 nanometers and less than about 550 nanometers.

The plurality of depressions may have an average depth from about 4 nanometers or about 15 nanometers to about 30 nanometers or about 60 nanometers or about 100 nanometers. For example, the plurality of depressions may have an average depth from about 4 nanometers to about 65 nanometers, from about 4 nanometers to about 40 nanometers, from about 4 nanometers to about 20 nanometers, from about 8 nanometers to about 20 nanometers, or from about 15 nanometers to about 90 nanometers.

In one embodiment, at least one of the anterior surface and the posterior surface of the lens body has an average surface roughness of from about 5 nanometers RMS or about 7 nanometers RMS or about 10 nanometers RMS to about 20 nanometers RMS or about 25 nanometers RMS or about 30 nanometers RMS. Thus, the present silicone hydrogel contact lenses may have an average surface roughness from about 5 nanometers RMS to about 30 nanometers RMS, from about 7 nanometers RMS to about 25 nanometers RMS or from about 10 nanometers RMS to about 20 nanometers RMS.

In one embodiment, the average density of the depressions, meaning the average number of depressions per 900 square micrometers of surface, on the at least one of the anterior surface and the posterior surface of the lens body is from about 5 or about 80 or about 100 or about 200 depressions per 900 square micrometers of surface to about 1000 or about 1200 or about 1500 depressions per 900 square micrometers of surface. Thus, the average density of the depressions on at least one of the anterior surface and the posterior surface of the lens body of the present contact lenses may be from about 5 depressions per 900 square micrometers of surface to about 1500 depressions per 900 square micrometers of surface, from about 80 depressions per 900 square micrometers of surface to about 1500 depressions per 900 square micrometers of surface, from about 100 depressions per 900 square micrometers of surface to about 1200 depressions per 900 square micrometers of surface, or from about 200 depressions per 900 square micrometers of surface to about 1000 depressions per 900 square micrometers of surface.

The plurality of depressions extend inwardly into the lens body, for example, from the otherwise substantially smooth anterior and/or posterior surface of the lens body. Thus, the present plurality of depressions, as well as the otherwise substantially smooth anterior and/or posterior surface of the present lens bodies are not, and cannot reasonably be considered to be raised ridges. In short, the present lens bodies may be free of raised ridges. Moreover, as noted above, the plurality of depressions on the anterior surface, the posterior surface, or both of the present lens bodies, together with other surface characteristics of the present contact lenses, may provide a degree of surface roughness. However, it has been found that such surface roughness does not substantially adversely impact the comfort of the lens wearer. In addition, it is understood that the depressions present on the surface of the lens bodies do not extend through the entire thickness of the lens body to the other opposing surface, and therefore, the present depressions are not pores extending through the lens bodies.

The ability of the present contact lenses to substantially maintain the advancing contact angle and water breakup times for a period of time, for example, of at least 12 hours after hydration, indicates that the beneficial surface wettability properties of the lens bodies of the present contact lenses remain for a substantial period of time or are substantially long lasting or even substantially permanent, rather than being a phenomenon that occurs only immediately after or following hydration. The wettability properties of the present contact lenses may be useful to lens wearers who wear such lenses on an extended basis, e.g., for at least about 1 day or about 5 days or about 10 days or up to about 30 days of continuous wear.

In one embodiment, the lens body is water swellable, for example, having a swell factor of at least about 20 percent. The equilibrium water content (EWC) of the lens body may be at least about 25% or at least about 30% or at least about 35% or at least about 40% or at least about 50% or more.

The lens bodies of the present silicone hydrogel contact lenses comprise units of at least one silicone-containing monomer, silicone-containing macromer, silicone-containing prepolymer, or combinations thereof. The lens bodies may comprise a hydrophilic silicone-containing polymeric material.

In certain embodiments, the lens bodies of the present contact lenses include no hydrophilic polymeric internal wetting agent physically entangled within the polymeric matrix of the lens body. For example, no hydrophilic polymeric wetting agent is included in the polymerizable composition which is cured to form the lens body.

In one embodiment, the lens bodies of the present contact lenses are fully or partially cured while in direct contact with a contact lens mold comprising a non-polar material. For example, and without limitation, the non-polar material may comprise polypropylene, similar non-polar materials, and mixtures thereof. In certain embodiments, the present silicone hydrogel contact lenses are cast molded in a contact lens mold assembly formed of a nucleated thermoplastic polypropylene resin having (i) a melt flow rate between about 15 g/10 min and about 40 g/10 min,
(ii) a density of about 0.900 g/cm$^3$,
(iii) a linear flow mold shrink from about 0.010 to about 0.020 in/in,
(iv) a tensile strength of about 5600 psi,
(v) a tensile elongation at yield of about 8.0%,
(vi) a flexural modulus from about 200,000 psi to about 290,000 psi,
(vii) a Rockwell hardness of about 110, or combinations of two or more thereof.

The present contact lenses may have a lens body which comprises a reaction product of a polymerizable composition comprising reactive ingredients. The reactive ingredients include: (1) at least one component selected from the group consisting of silicone-containing monomers, silicone-containing macromers, silicone-containing prepolymers and mixtures thereof; (2) at least one hydrophilic monomer; and (3) at least one crosslinking agent that crosslinks the reactive ingredients during polymerization to form a polymeric lens body. In one embodiment, the lens body is formed by a process comprising polymerization of a polymerizable composition in the absence of a diluent. In other words, the polymerizable composition is a diluent-free polymerizable composition.

Silicone-containing monomers useful in the present polymerizable compositions may have a molecular weight less than 700 Daltons. Silicone-containing macromers useful in the present polymerizable compositions may have a molecular weight from about 700 Daltons to about 2000 Daltons. Silicone-containing prepolymers useful in the present polymerizable compositions may have a molecular weight greater than 2000 Daltons. The molecular weight may either be a number average molecular weight or a weight average molecular weight, as understood by persons of ordinary skill in the art.

In an embodiment, the lens bodies of the present contact lenses are cast molded lens bodies that include an anterior surface and a posterior surface, each surface being free of a plasma treated surface. In other words, the lens bodies, including the anterior and posterior surfaces, are formed from a single cast molding step, and are formed without exposing the surfaces to a form of plasma treatment. In another embodiment, the lens bodies of the present contact lenses include a surface layer having a different composition relative to the remainder of the lens body, for example, a surface layer formed by exposing the lens body to water or to an aqueous solution.

In some embodiments, the lens bodies of the present contact lenses are not subjected to extraction with an organic solvent or an aqueous solution including an organic solvent component prior to hydration in the water or the aqueous solution. The present contact lenses may have effectively or sufficiently wettable surfaces without extraction with an organic solvent, for example and without limitation, a volatile alcohol, or an aqueous solution including an organic solvent. Such ophthalmically acceptable or biocompatible contact lenses can be obtained by one water flush or wash, or a plurality of water flushes or washes. It can be understood that the present contact lenses comprise lens bodies that have been washed with a water-containing, volatile alcohol-free, washing liquid or washing liquids. The lenses can be washed with such volatile alcohol-free liquids one or more times, and the washing can occur in the final contact lens package or in one or more other washing containers.

The lens bodies of the present contact lenses may be contacted with liquid water or an aqueous medium prior to placement in a packaging liquid. The aqueous medium may include a surfactant component. In one embodiment such water or aqueous medium does not include an organic solvent or a volatile alcohol.

In another broad aspect of the present invention, methods of manufacturing contact lenses are provided. The present methods comprise forming a contact lens body having an anterior surface and a posterior surface, wherein after hydration in water or an aqueous solution, at least one of the anterior surface and the posterior surface of the lens body when wet comprises a plurality of depressions with an average diameter between about 50 nanometers and less than 1500 nanometers, and wherein: (A) the lens body has not been subjected to a form of plasma treatment, (B) the lens body is not treated with a polymerizable swelling agent after the lens body is formed or both (A) and (B).

The forming step may comprise polymerizing a polymerizable composition comprising reactive ingredients. The reactive ingredients include (1) at least one component selected from the group consisting of silicone-containing monomers, silicone-containing macromers, silicone-containing prepolymers and mixtures thereof; (2) at least one hydrophilic monomer and (3) at least one crosslinking agent effective to crosslink the reactive ingredients during the polymerizing step.

The contact lenses and lens bodies made in accordance with the present methods may be the contact lenses and contact lens bodies described elsewhere herein.

The present methods may be carried out using a contact lens mold comprising a non-polar material, for example, as described elsewhere herein.

Various embodiments of the present invention are described in detail in the detailed description and additional disclosure below. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention. Additional embodiments of the present invention are apparent in the following detailed description, examples and claims, the contents of which are an integral part of the present application.

BRIEF DESCRIPTION OF FIGURES

FIG. 1 shows the average diameter of depression (nm) determined by Atomic Force Microscopy (AFM) testing of a series of 16 test contact lenses and a series of commercially available silicone hydrogel contact lenses.

FIG. 2 shows the average depth of depression (nm) determined by AFM testing of a series of 16 test contact lenses and a series of commercially available silicone hydrogel contact lenses.

FIG. 3 shows the surface depression density determined by AFM testing of a series of 16 test contact lenses and a series of commercially available silicone hydrogel contact lenses.

FIG. 4 shows the average RMS surface roughness (nm) determined by AFM testing of a series of 16 test contact lenses and a series of commercially available silicone hydrogel contact lenses.

FIGS. 5-10 show a series of photographs showing the lens surface morphology as determined by AFM of 16 test contact lenses after hydration.

FIGS. 11-14 show a series of photographs showing the lens surface morphology as determined by AFM of various commercially available lenses after hydration.

FIGS. 15-18 show a series of photographs of several test contact lenses and a commercially available contact lens in both the wet or hydrated state and the dry state.

DETAILED DESCRIPTION

Figure 5:
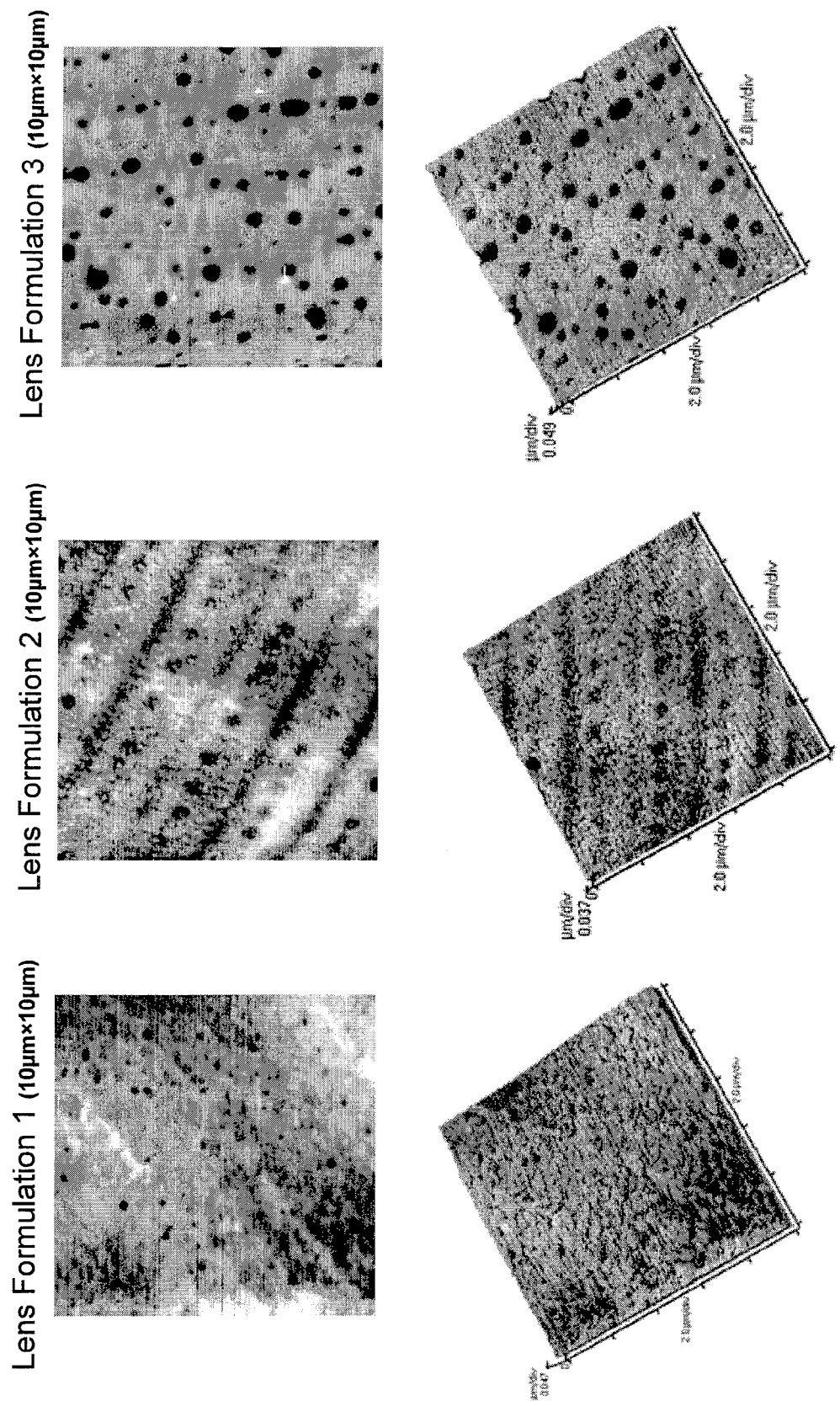
Figure 6:
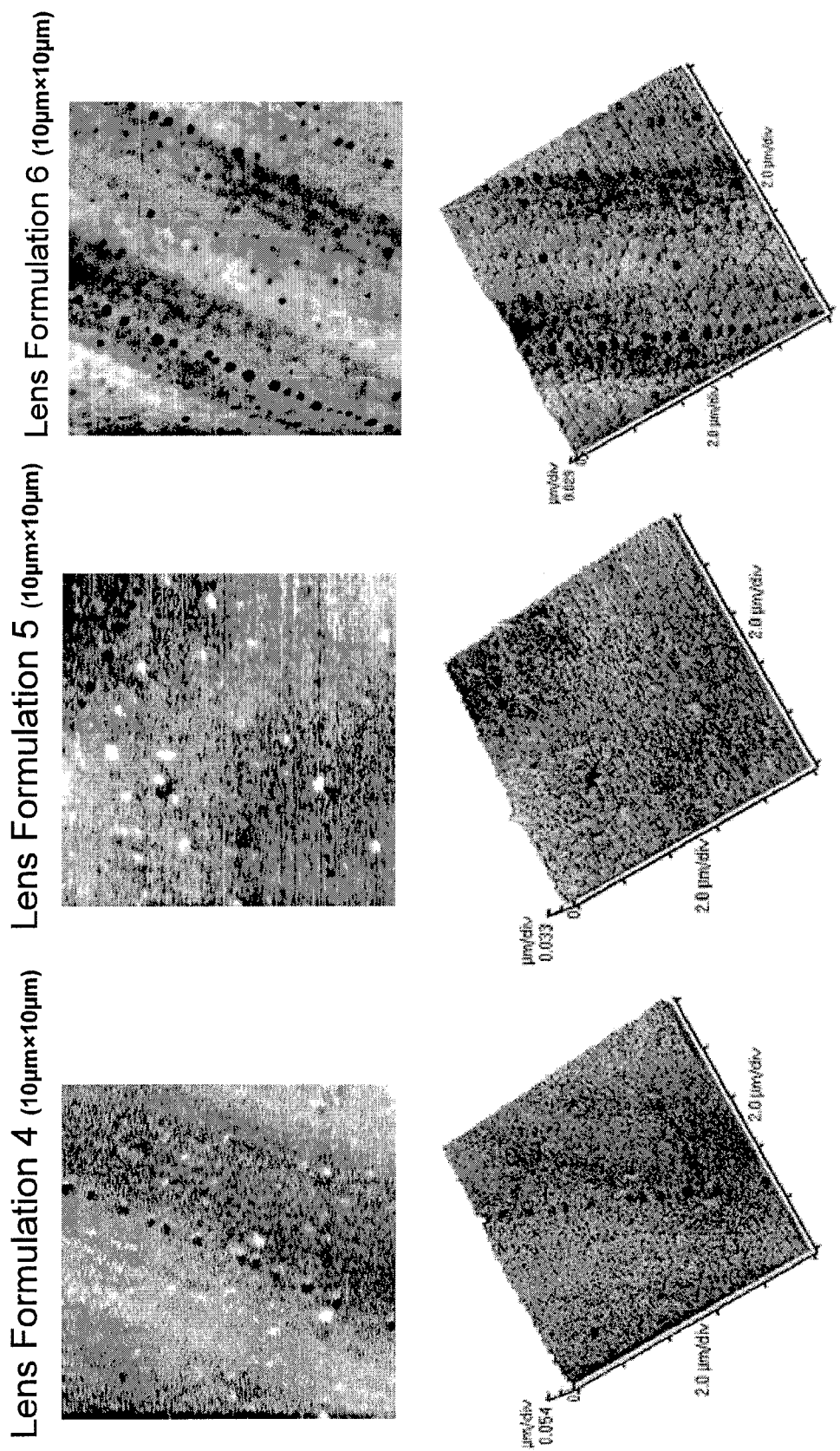
Figure 7:
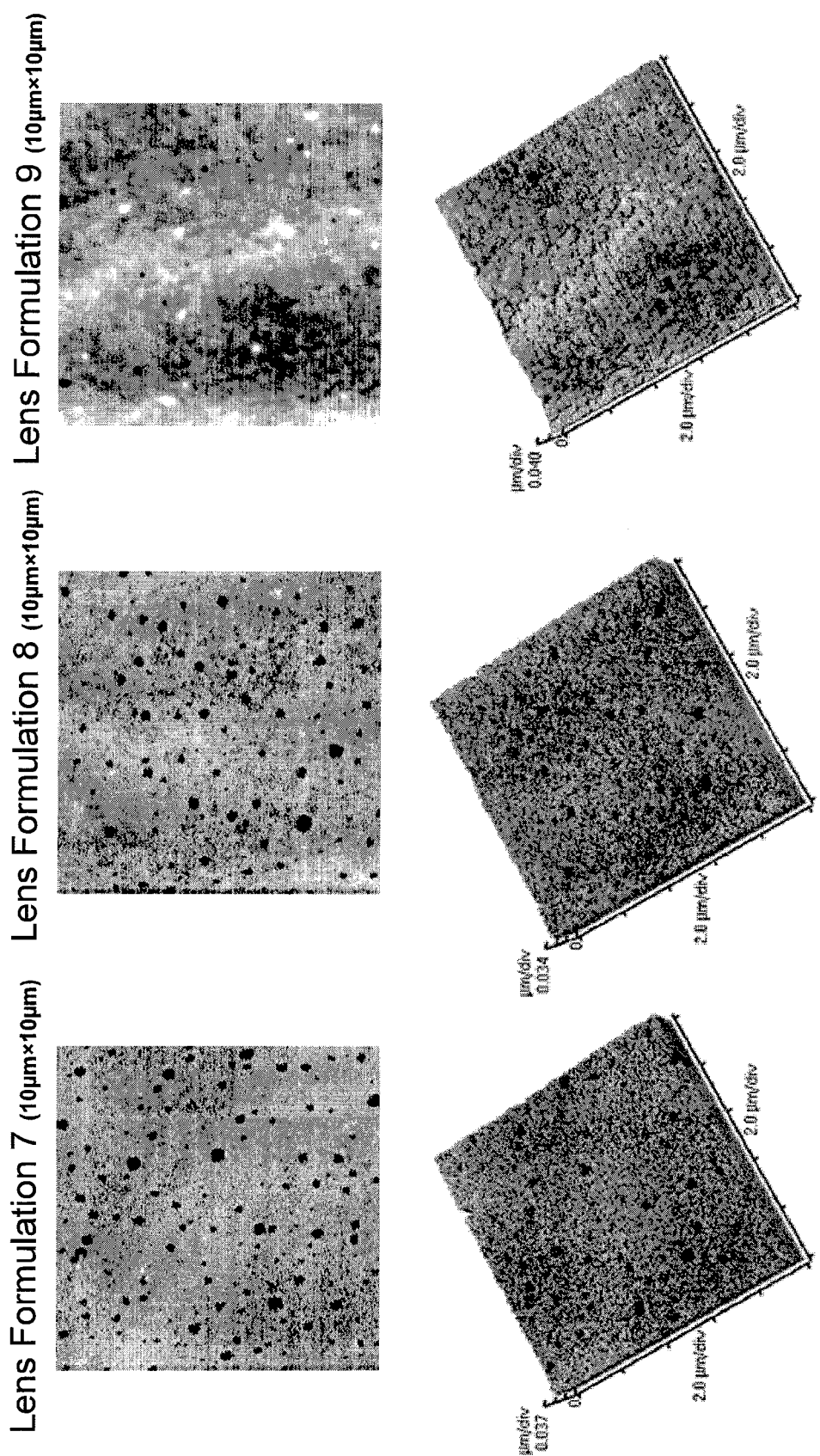
Figure 8:
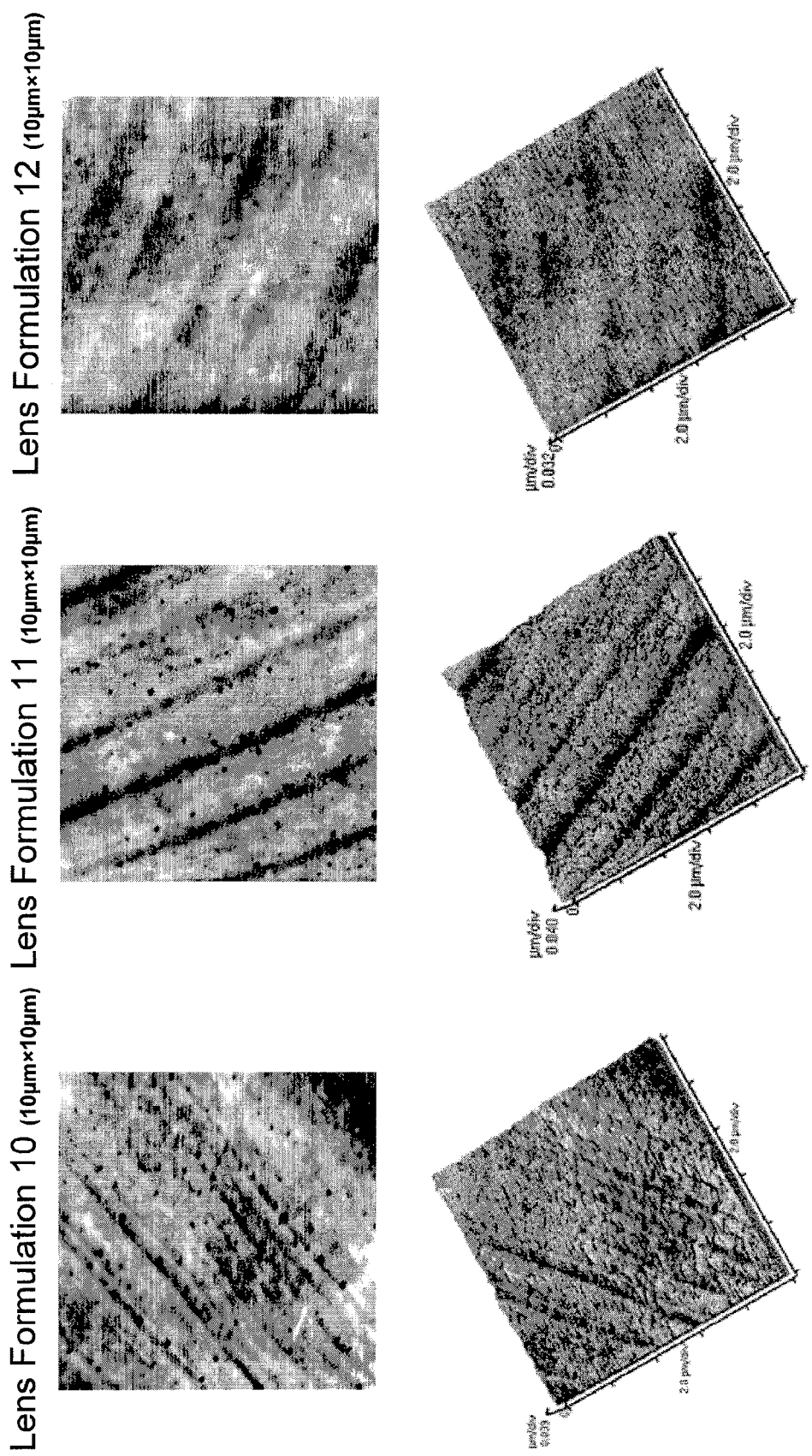
Figure 11:
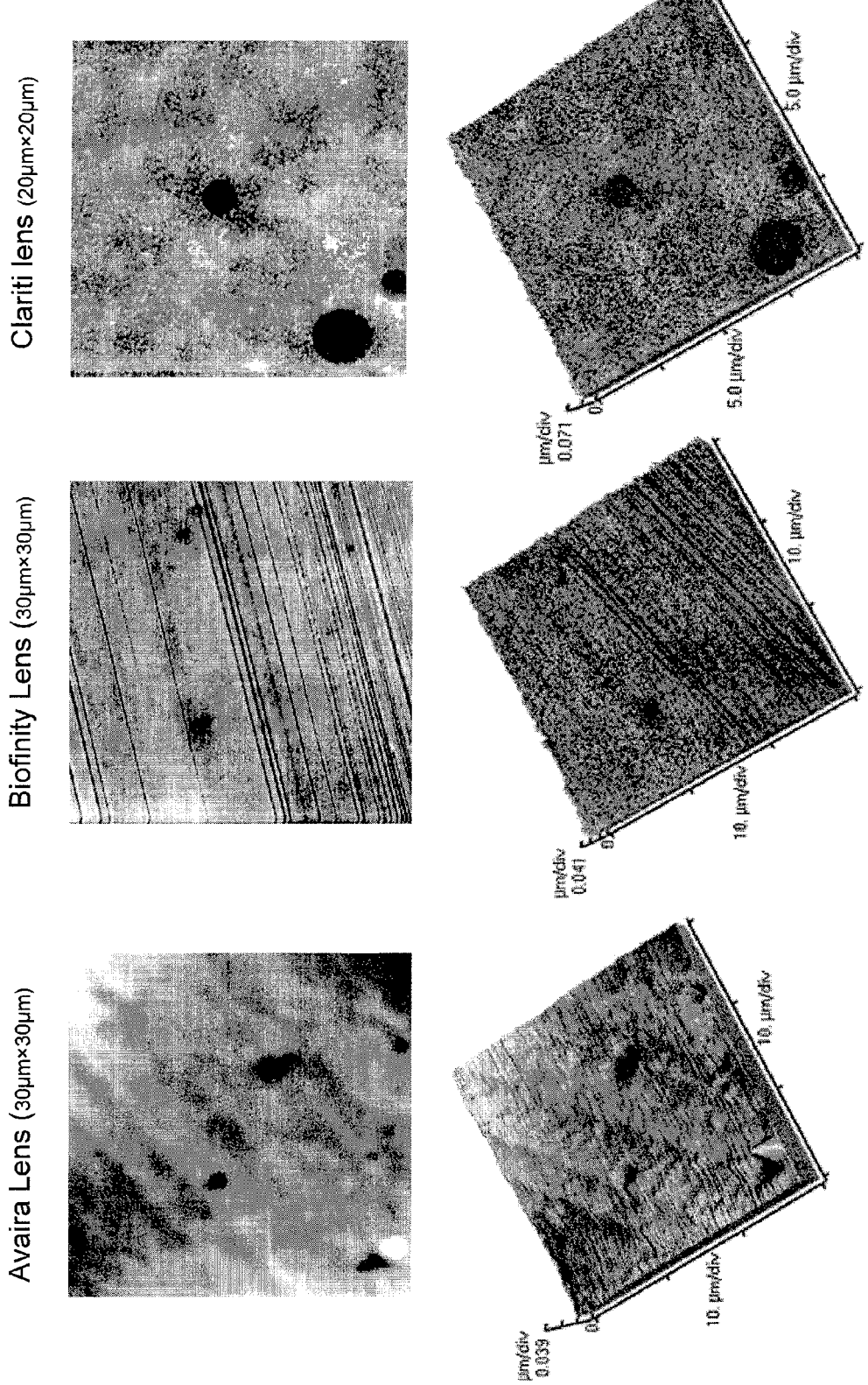
Figure 12:
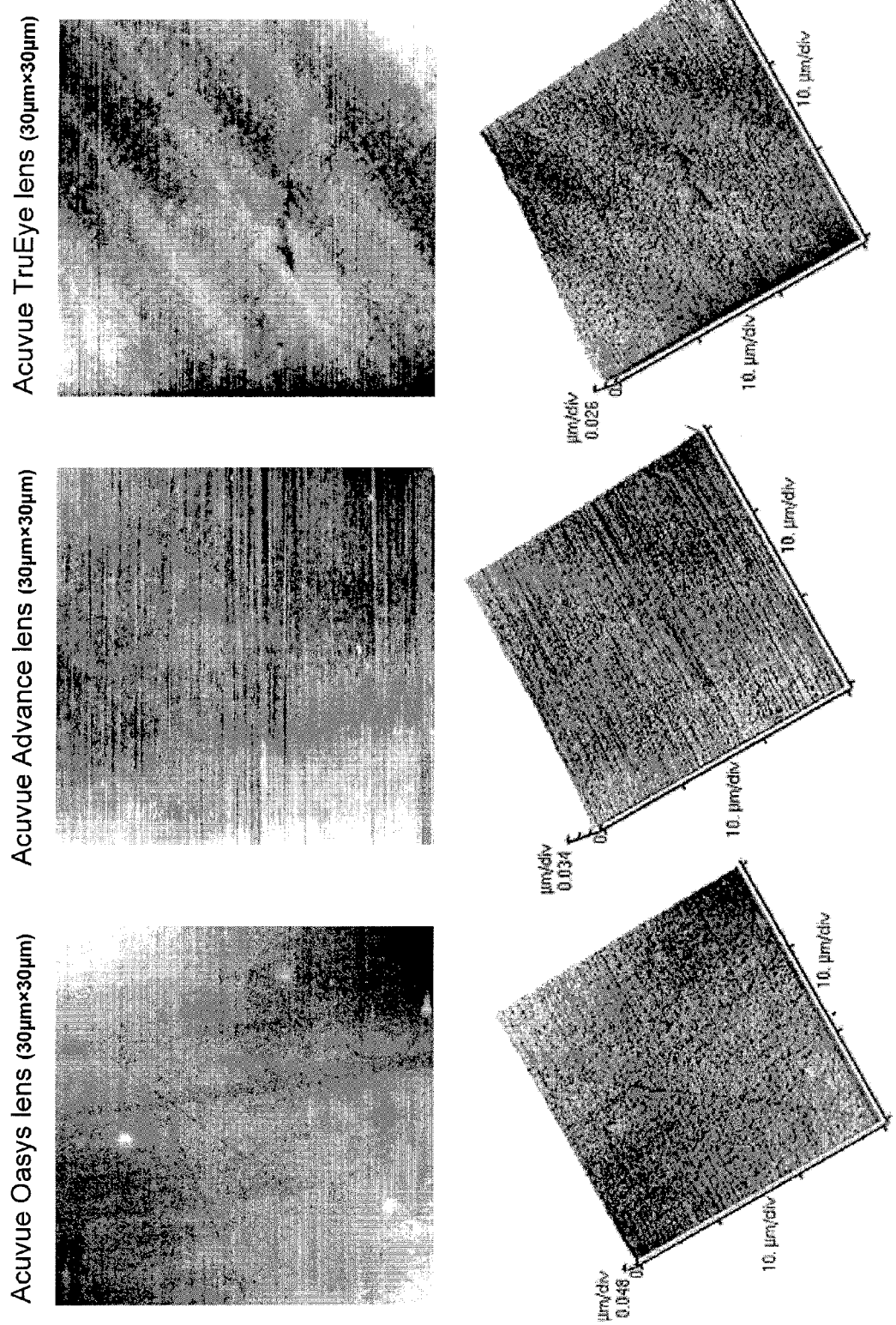
Figure 14:
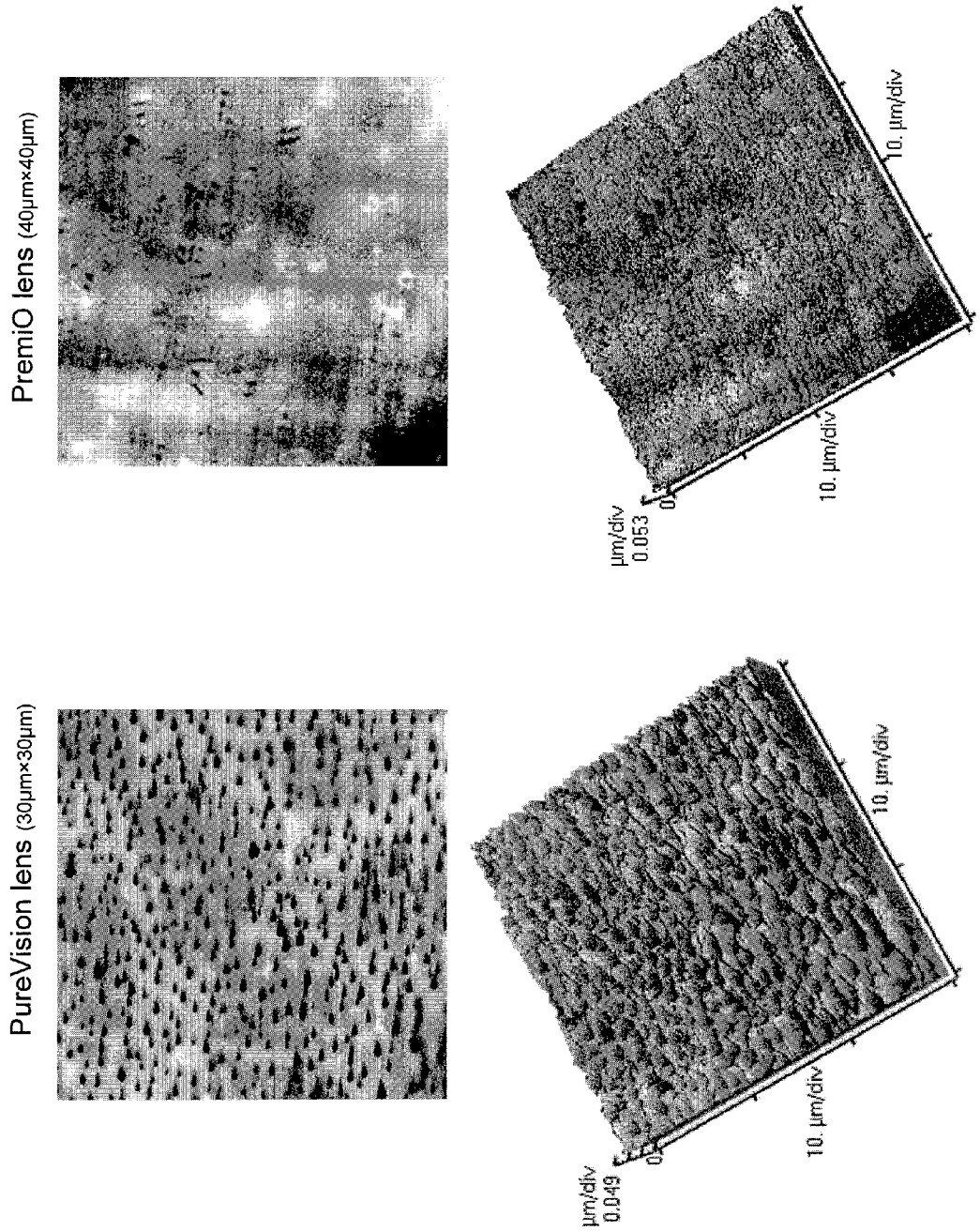

Definitions. In the context of the present description, additional disclosure claims and Attachment, the following terminology will be used in accordance with the definitions described below.

As used herein, the term "hydrogel" refers to a polymeric material, typically a network or matrix of polymer chains, capable of swelling in water or becoming swollen with water. A hydrogel can also be understood to be a material that retains water in an equilibrium state. The network or matrix may or may not be cross-linked. Hydrogels refer to polymeric materials, including contact lenses that are water swellable or are water swelled. Thus, a hydrogel may be (i) unhydrated and water swellable, or (ii) partially hydrated and swollen with water, or (iii) fully hydrated and swollen with water. The hydrogel may be a silicone hydrogel, a silicone-free hydrogel, or an essentially silicone-free hydrogel.

The term "silicone hydrogel" or "silicone hydrogel material" refers to a particular hydrogel that includes a silicon (Si)-containing component or a silicone (SiO)-containing component. For example, a silicone hydrogel is typically prepared by combining a silicon-containing material with conventional hydrophilic hydrogel precursors. A silicone hydrogel contact lens is a contact lens, including a vision correcting contact lens, which comprises a silicone hydrogel material.

A "silicone-containing" component is a component that contains at least one [—Si—O—Si—] linkage, in a monomer, macromer or prepolymer, wherein each silicon atom may optionally possess in some manner, for example, may optionally be chemically, such as covalently, bonded to, one or more organic radical substituents ($R_1$, $R_2$) or substituted organic radical substituents that may be the same or different, e.g., —$SiR_1R_2O$—.

"Molecular mass" in the context of a polymer described herein refers to the nominal average molecular mass of a polymer, typically determined by size exclusion chromatography, light scattering techniques, or intrinsic velocity determination in 1,2,4-trichlorobenzene. Molecular weight in the context of a polymer can be expressed as either a number-average molecular weight or a weight-average molecular weight, and in the case of vendor-supplied materials, will depend upon the supplier. Typically, the basis of any such molecular weight determinations can be readily provided by the supplier if not provided in the packaging material. Typically, references herein to molecular weights of monomers, macromers, pre-polymers or polymers herein refer to the weight average molecular weight. Both molecular weight determinations, number-average and weight-average, can be measured using gel permeation chromatographic or other liquid chromatographic techniques. Other methods for measuring molecular weight values can also be used, such as the use of end-group analysis or the measurement of colligative properties (e.g., freezing-point depression, boiling-point elevation, or osmotic pressure) to determine number-average molecular weight or the use of light scattering techniques, ultracentrifugation or viscometry to determine weight-average molecular weight.

A "network" or "matrix" of a hydrophilic polymer typically means that crosslinks are formed between polymer chains by covalent bonds or by physical bonds, e.g. hydrogen bonds. A network can include two or more polymeric components, and can include an interpenetrating polymer network (IPN) in which one polymer is physically entangled with a second polymer such that there are few, if any, covalent bonds between them, but the polymers cannot be separated from each other without destroying the network.

A "hydrophilic" substance is one that is water-loving or has an affinity for water. Hydrophilic compounds have an affinity to water and are usually charged or have polar moieties or groups that attract water.

A "hydrophilic polymer" as used herein is defined as a polymer having an affinity for water and capable of absorbing water. A hydrophilic polymer is not necessarily soluble in water. A hydrophilic polymer may be soluble in water or insoluble, e.g., substantially insoluble, in water.

A "hydrophilic component" is a hydrophilic substance that may or may not be a polymer. Hydrophilic components include those that are capable of providing at least from about 20% (w/w), for example, at least from about 25% (w/w) water content to the resulting hydrated lens when combined with the remaining reactive components. A hydrophilic component can include hydrophilic monomers, hydrophilic macromers, hydrophilic prepolymers, hydrophilic polymers, or combinations thereof. Hydrophilic macromers, hydrophilic prepolymers, and hydrophilic polymers may also be understood to have hydrophilic portions and hydrophobic portions. Typically, the hydrophilic portion and the hydrophobic portion are present in relative amounts such that the macromers, prepolymers, or polymers are hydrophilic.

A "monomer" refers to a relatively low molecular weight compound, for example a compound with an average molecular weight less than 700 Daltons, that is polymerizable. In one example, a monomer can comprise a single unit of a molecule containing one or more functional groups capable of polymerizing to combine with other molecules to form a polymer, the other molecules being of the same structure or different structures as the monomer.

A "macromer" refers to medium and high molecular weight compounds or polymers, which can contain one or more functional groups capable of polymerization or further polymerization. For example, a macromer can be a compound or polymer with an average molecular weight of from about 700 Daltons to about 2,000 Daltons.

A "prepolymer" refers to a polymerizable or crosslinkable higher molecular weight compound. A prepolymer, as used herein can contain one or more functional groups. In one example, a prepolymer can be a series of monomers or macromers bonded together such that the overall molecule remains polymerizable or crosslinkable. For example, a prepolymer can be a compound with an average molecular weight greater than about 2,000 Daltons.

A "polymer" refers to a material formed by polymerizing one or more monomers, macromers, prepolymers or mixtures thereof. As used herein, a polymer is understood to refer to a molecule that is not capable of being polymerized, but is capable of being crosslinked to other polymers, for example, to other polymers present in a polymerizable composition or during the reaction of monomers, macromers and/or prepolymers to form other polymers in a polymerizable composition.

An "interpenetrating polymer network" or "IPN" refers to a combination of two or more different polymers, in network form, of which at least one is synthesized and/or cross-linked in the presence of the other without or substantially without any covalent bonds between them. An IPN can be composed of two kinds of chains forming two separate networks, but in juxtaposition or interpenetrating. Examples of IPNs include sequential IPNs, simultaneous IPNs, semi-IPNs and homo-IPNs.

A "pseudo IPN" refers to a polymeric reaction product where at least one of the different polymers is cross-linked while at least one other polymer is non-crosslinked (e.g. linear or branched), wherein the non-cross-linked polymer is distributed in and held by the cross-linked polymer on a molecular scale such that the non-cross-linked polymer is substantially unextractable from the network.

A "polymeric mixture" refers to a polymeric reaction product wherein different polymers are both linear or branched, substantially without cross-linking, wherein the resulting polymeric blend that is obtained is a polymer mixture on a molecular scale.

A "graft polymer" refers to a branched polymer having side chains comprising a homopolymer or copolymer different to that of the main chain.

"Attach" can refer to any of charge attachment, graft, complex, bond (chemical bond or hydrogen), or adhere, unless specified otherwise.

As used herein, an "ophthalmically acceptable lens forming component" refers to a lens forming component that can be incorporated into a hydrogel contact lens without the lens wearer experiencing or reporting substantial discomfort, including ocular irritation and the like. Ophthalmically acceptable hydrogel contact lenses have ophthalmically acceptable surface wettabilities, and typically do not cause or are not associated with significant corneal swelling, corneal dehydration ("dry eye"), superior-epithelial arcuate lesions ("SEALs"), or other significant discomfort.

The term "organic solvent" refers to an organic substance which has the ability to solvate or dissolve at least one material, for example and without limitation, unreacted materials, diluents and the like, present in a contact lens body which has not previously been subjected to extraction processing. In one example, the material is a material that is not soluble or does not dissolve in water or an aqueous solution. In another example, the material is a material that is not as soluble or does not dissolve as much in water or an aqueous solution, i.e., the material has increased solvation in the organic solvent as compared to water or an aqueous solution. Thus, the organic solvent in contact with such an unextracted contact lens body is effective to solvate or dissolve at least one material present in the lens body, or to increase the solvation or dissolve to a greater extent the at least one material present in the lens body to reduce the concentration of the at least one material in the lens body, or to reduce the concentration of the at least one material in the lens body as compared to a lens body treated with water or an aqueous solution. The organic solvent may be used without dilution, that is 100% organic solvent, or may be used in a composition including less than 100% organic solvent, for example and without limitation, an aqueous solution including an organic solvent. In general, an organic solvent acts, for example, directly acts, on the at least one material to solvate or dissolve the at least one material. Examples of organic solvents include, without limitation, alcohols, e.g., alkanols, such as ethanol, isopropanol and the like, chloroform, butyl acetate, tripropylene glycol methyl ether, dipropylene glycol methyl ether acetate, and the like and mixtures thereof.

The term "surfactant" or "surfactant component" refers to a substance which has the ability to reduce the surface tension of water, for example, water or an aqueous solution in which the substance is present. By reducing the surface tension of the water, the surfactant or surfactant component facilitates the water containing the surfactant or surfactant component, when in contact with a contact lens body which has not previously been subjected to extraction processing with an organic solvent, to more intimately contact the lens body and/or more effectively wash or remove at least one material present in the lens body from the lens body relative to the water without the surfactant or surfactant component. Generally, a surfactant or surfactant component does not act directly on the at least one material to solvate or dissolve the at least one material. Examples of surfactants or surfactant components include, without limitation, zwitterionic surfactants including forms of betaine, non-ionic surfactants including forms of polysorbate such as polysorbate 80, forms of poloxamers or poloxamines, fluorinated surfactants, and the like and mixtures thereof.

Additional definitions may also be found in the sections that follow.

Lens Formulations.

Hydrogels represent one class of materials used for the present contact lenses. Hydrogels comprise a hydrated, crosslinked polymeric system containing water in an equilibrium state. Accordingly, hydrogels are copolymers prepared from one or more reactive ingredients. The reactive ingredients are crosslinkable with a crosslinking agent.

Hydrophilic Monomer.

The hydrophilic monomer can be, for example, a silicone-containing monomer having a hydrophilic portion, a hydrophilic silicone-free monomer, or a combination thereof. The hydrophilic monomer can be used in combination with a hydrophobic monomer. The hydrophilic monomer can be a monomer having both hydrophilic and hydrophobic portions or moieties. The type and amount of hydrophilic monomer used in the polymerizable lens composition can vary depending on the types of other lens-forming monomers that are used. Non-limiting illustrations are provided herein with respect to hydrophilic monomers for use in silicone hydrogels.

Crosslinking Agent.

Crosslinking agents for the monomers, macromers, or prepolymers, used in preparing the hydrogels can include those that are known in the art, and examples of the crosslinking agents are also provided herein. Suitable crosslinking agents include, for example, a diacrylate-(or divinyl ether-) functionalized ethylene oxide oligomer or monomer, such as, for example, tri(ethylene glycol)dimethacrylate (TEGDMA) tri(ethylene glycol)divinyl ether (TEGDVE), ethylene glycol dimethacrylate (EGDMA), and trimethylene glycol dimethacrylate (TEGDMA). Typically, the crosslinking agents are present in the polymerizable silicone hydrogel composition in relatively small total amounts in the polymerizable composition, such as in an amount ranging from about 0.1% (w/w) to about 10% (w/w), or from about 0.5% (w/w) to about 5% (w/w), or from about 0.75% (w/w) to about 1.5% (w/w), by weight of the polymerizable composition.

Silicone Hydrogel Lens Formulations.

A silicone hydrogel lens formulation comprises at least one silicone-containing component, at least one compatible hydrophilic monomer, and at least one compatible crosslinking agent. With respect to polymerizable lens formulations as discussed herein, "compatible" components refers to components which, when present in a polymerizable composition prior to polymerization, form a single phase that is stable for a duration of time adequate to allow manufacture of a polymerized lens body from the composition. For some components, a range of concentrations may be found to be compatible. Additionally, "compatible" components are components which, when polymerized to form a polymerized lens body, produce a lens that has adequate physical characteristics to be used as a contact lens (e.g., adequate transparency, modulus, tensile strength, etc.)

Silicone-Containing Component.

The Si and attached O portion (Si—O portion) of the silicone-containing component can be present in the silicone-containing component in an amount greater than 20% (w/w), for example greater than 30% (w/w), of the total molecular weight of the silicone-containing component. Useful silicone-containing components comprise polymerizable functional groups such as vinyl, acrylate, methacrylate, acrylamide, methacrylamide, N-vinyl lactam, N-vinylamide, and styryl functional groups. The silicone-containing component from which the present contact lenses may be obtained, for example, by polymerization, include one or more silicone-containing monomers, one or more silicone-containing macromers, one or more silicone-containing prepolymers, or mixtures thereof. Silicone hydrogel contact lenses produced as described herein can be based on a silicone-containing monomer and/or a silicone-based macromer and/or a silicone-based prepolymer, and a hydrophilic monomer or co-monomer, and a crosslinking agent. In addition to the other silicone-containing compounds described herein, examples of still further silicone-containing components that may be useful in the present lenses can be found in U.S. Pat. Nos. 3,808,178, 4,120,570, 4,136,250, 4,139,513, 4,153,641, 4,740,533, 5,034,461, 5,496,871, 5,959,117, 5,998,498, and 5,981,675, and U.S. Pat. Application Publication Nos. 2007/0066706A1, 2007/0296914A1, and 2008/0048350A1, all of which are incorporated in their entireties herein by reference. The silicone-containing component can be a silicone-containing monomer or a silicone-containing macromer or a silicone-containing prepolymer.

A silicone-containing monomer, macromer, or prepolymer can have, for example, the following general structure (I):

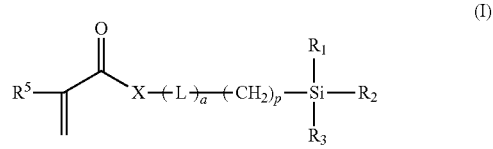

(I)

where $R^5$ is H or $CH_3$, X is O or $NR^{55}$ where $R^{55}$ is H or a monovalent alkyl group with 1 to 4 carbon atoms, a is 0 or 1, L is a divalent linking group which comprises from 1 to 20 carbon atoms, or from 2 to 10 carbon atoms, which can also optionally comprise ether and/or hydroxyl groups, for example, a polyethylene glycol chain, p can be from 1 to 10, or from 2 to 5, $R_1$ $R_2$, and $R_3$ can be the same or different and are groups independently selected from hydrocarbon groups having 1 to about 12 carbon atoms (e.g., methyl groups), hydrocarbon groups substituted with one or more fluorine atoms, a siloxanyl group, and siloxane chain-containing moieties, wherein at least one of $R_1$, $R_2$, and $R_3$ comprises at least one siloxane unit (—OSi). For example, at least of one of $R_1$, $R_2$, and $R_3$ can comprise —OSi $(CH_3)_3$ and/or —OSi $(R^{52}R^{53}R^{54})$ where $R^{52}$, $R^{53}$ $R^{54}$ are independently ethyl, methyl, benzyl, phenyl or a monovalent siloxane chain comprising from 1 to about 100, or from about 1 to about 50, or from about 1 to about 20, repeating Si—O units.

One, two, or all three of $R_1$, $R_2$, and $R_3$ can also comprise other siloxanyl groups or siloxane chain-containing moieties.

The combined linkage of —X-L-, where present in a silicone-containing monomer, macromer or prepolymer of structure (I), can contain one or more heteroatoms that are either O or N. The combined linkage can be straight chain or branched, where carbon chain segments thereof can be straight chain. The combined linkage of —X-L- can optionally contain one or more functional groups selected from, e.g., carboxyl, amide, carbamate, and carbonate. Examples of such combined linkages are provided, for example, in U.S. Pat. No. 5,998,498 and U.S. Pat. Application Publication Nos. 2007/0066706 A1, 2007/0296914 A1, and 2008/0048350, all the disclosures of which are incorporated herein by reference. The silicone-containing monomer, macromer or prepolymer used in accordance with the present invention can comprise a single acryloyl group, such as shown in structure (I), or optionally can possess two acryloyl groups, such as one at each terminus of the monomer, macromer or prepolymer. Combinations of both types of the silicone-containing monomers, macromers or prepolymers optionally can be used in polymerizable compositions useful in accordance with the present invention.

Examples of silicone-containing components useful in accordance with the present invention include, for example and without limitation, polysiloxanylalkyl(meth)acrylic monomers, macromers or prepolymers including, without limitation, methacryloxypropyl tris(trimethylsiloxy)silane, pentamethyldisiloxanyl methylmethacrylate, and methyldi(trimethylsiloxy)methacryloxymethyl silane.

Specific examples of the useful silicone-containing monomers, macromers or prepolymers can be, for example, 3-[tris (trimethylsilyloxy)silyl]propyl methacrylate ("Tris" available from Gelest, Morrisville, Pa., USA), and monomethacryloxypropyl terminated polydimethylsiloxane ("MCS-M11" available from Gelest, Morrisville, Pa., USA). Examples of some silicone-containing monomers are disclosed in US Patent Application Publication No. 2008/0269429. These silicone-containing monomers can have an alkylene group as a divalent linkage group (e.g., —$(CH_2)_p$—) and "a" can be 0 with reference to structure (I), and at least two siloxanyl groups. These silicone-containing components are designated herein as Structure (A) class silicone-containing monomers. Exemplary non-limiting structures of these silicone-containing monomers are shown as follows:

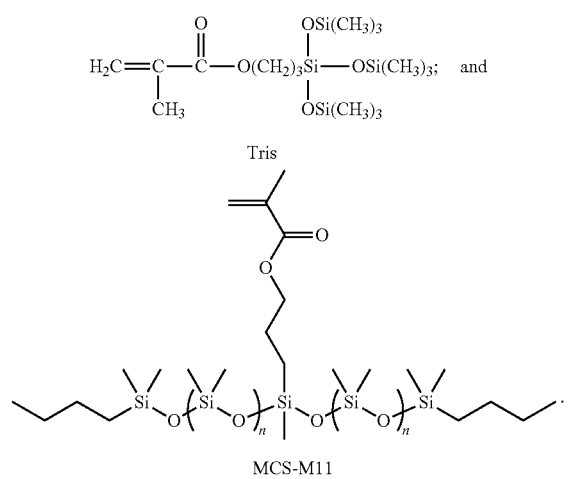

Tris

MCS-M11

Other specific examples of silicone-containing components useful in the present invention can be, for example, 3-methacryloxy-2-hydroxypropyloxy)propylbis(trimethylsiloxy)methylsilane ("SiGMA", available from Gelest, Morrisville, Pa., USA) and methyldi(trimethylsiloxy)sylylpropylglycerolethyl methacrylate ("SiGEMA"). These silicone-containing components include at least one hydroxyl group and at least one ether group in the divalent linking group L shown in structure (I) and at least two siloxanyl groups. These silicone-containing components are designated herein as Structure (B) class silicone-containing components. Additional details on this class of silicone-containing components are provided, for example, in U.S. Pat. No. 4,139,513, which is incorporated in its entirety herein by reference. SiGMA, for example, can be represented by the following exemplary non-limiting structure:

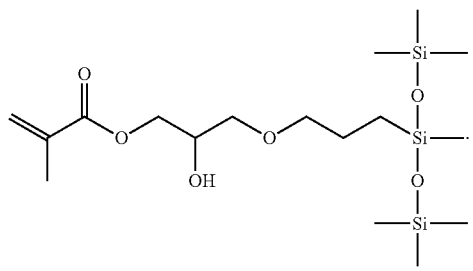

SiGMA

Silicone-containing components of Structures (A) and (B) can be used individually or in any combinations thereof in polymerizable compositions useful in accordance with the present invention. Silicone-containing components of structures (A) and/or (B) may be further used in combination with at least one silicone-free hydrophilic monomer such as described herein. If used in combination, for example, the amount of silicone-containing components of Structure (A) can be, for example, from about 10% (w/w) to about 40% (w/w), or from about 15% (w/w) to about 35% (w/w), or from about 18% (w/w) to about 30% (w/w). The amount of silicone-containing components of Structure (B) can be, for example, from about 10% (w/w) to about 45% (w/w), or from about 15% (w/w) to about 40% (w/w), or from about 20% (w/w) to about 35% (w/w).

The presently useful polymerizable compositions may include one or more non-silicone-containing hydrophobic monomers. Examples of such hydrophobic monomers include, without limitation, acrylic and methacrylic acids and derivatives thereof. An example of a non-silicone containing hydrophobic monomer includes, without limitation, methylmethacrylate. Combinations of two or more hydrophobic monomers may be employed.

Other specific examples of the useful silicone-containing components useful in accordance with the present invention can be chemicals represented by the following formulas, or chemicals described in Japanese patent application publication number 2008-202060A, which is hereby incorporated by reference in its entirety, for example,

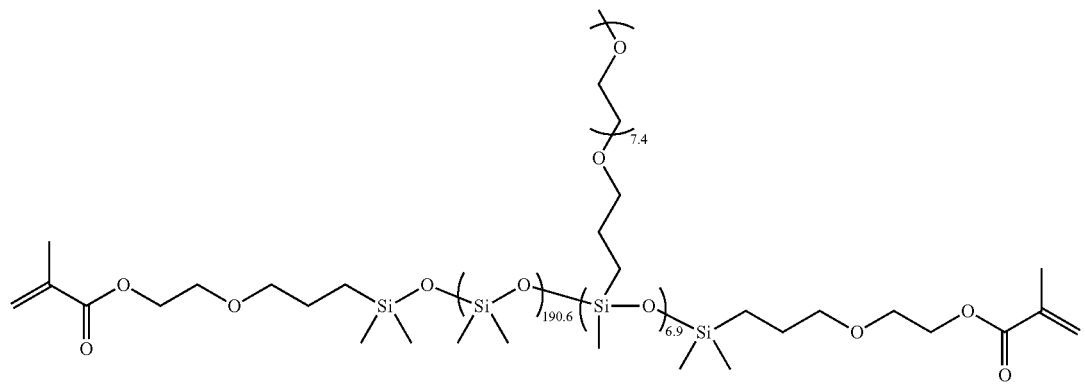

X-22-1625
Mw=9,000 or 18,000

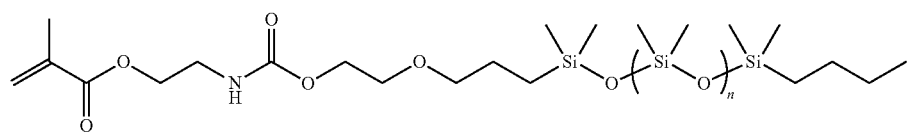

FMM, Mw=1,500

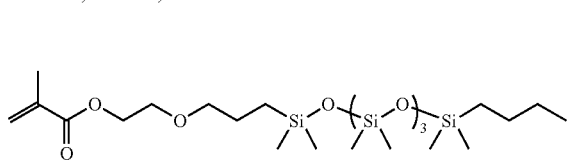

X-22-1622, Mw=582

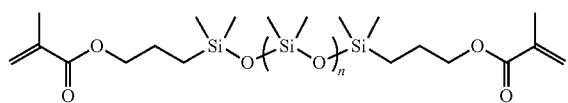

DMS-R18, Mw=4500~5500

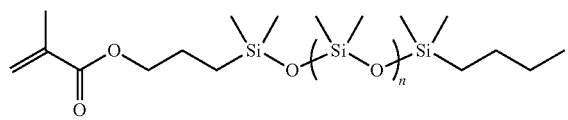

MCR-M07, Mw=1132

Yet other specific examples of the useful silicone-containing components useful in accordance with the present invention can be chemicals represented by the following formulas, or chemicals described in U.S. patent application publication number 2009/0234089, which is hereby incorporated by reference in its entirety. In one example, the silicone-containing component can comprise one or more a hydrophilic polysiloxane components represented by general formula (II),

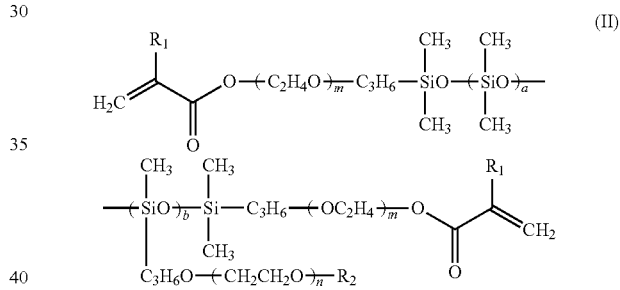

wherein $R_1$ is selected from either hydrogen or a methyl group; $R_2$ is selected from either of hydrogen or a $C_{1-4}$ hydrocarbon group; m represents an integer of from 0 to 10; n represents an integer of from 4 to 100; a and b represent integers of 1 or more; a+b is equal to 20-500; b/(a+b) is equal to 0.01-0.22; and the configuration of siloxane units includes a random configuration. Examples of such silicone-containing components are described in the Examples section of U.S. patent application publication number 2009/0234089, including Example 2 on page 7.

Other silicone-containing components also can be used. For example, other suitable types can include, for example, poly(organosiloxane) monomers, macromers or prepolymers such as α,ω-bismethacryloxy-propyl polydimethylsiloxane. Another example is mPDMS (monomethacryloxypropyl terminated mono-n-butyl terminated polydimethylsiloxane). Other useful silicone containing components include silicone-containing vinyl carbonate or vinyl carbamate monomers, macromers or prepolymers including, without limitation, 1,3-bis[4-(vinyloxycarb-onyloxy)but-1-yl] tetramethylisiloxane 3-(vinyloxycarbonylthio)propyl-[tris (trimethylsiloxysilane], 3-[tris(trimethylsiloxy)silyl]propyl allyl carbamate, 3-[tris(trimethylsiloxy)silyl]propyl vinyl carbamate; trimethylsilylethyl vinyl carbonate, and trimethylsilylmethyl vinyl carbonate. Examples of one or more of these silicone-containing components can be provided, for example, in U.S. Pat. No. 5,998,498 and U.S. Pat. Application Publication Nos. 2007/0066706 A1, 2007/0296914 A1, and 2008/0048350, all the disclosures of which are incorporated herein by reference.

Some of the silicone-containing monomers, macromers or prepolymers that can be used in accordance with the present invention can be used as a single discrete monomer, macromer or prepolymer, or can be used as a mixture of two or more discrete monomers, macromers or prepolymers. For example, MCR-M07 is often provided as a mixture of silicone-containing compounds with a wide distribution of molecular weights. Alternatively, some of the silicone-containing monomers, macromers or prepolymers that can be used in accordance with the present invention can be provided as two or more monomers, macromers or prepolymers with discrete molecular weights. For example, X-22-1625 is available in a lower molecular weight version with a molecular weight of about 9000 Daltons, and as a higher molecular weight version with a molecular weight of about 18,000 Daltons.

Silicone-Free Monomers. Hydrophilic silicone-free monomers are included in the polymerizable compositions used to make the present contact lenses. The silicone-free monomers exclude hydrophilic compounds that contain one or more silicon atoms. Hydrophilic silicone-free monomers can be used in combination with silicone-containing monomers, macromers or prepolymers in the polymerizable compositions to form silicone hydrogels. Hydrophilic silicone-free monomers can be used in combination with other silicone-free monomers, including silicone-free hydrophilic monomers and silicone-free hydrophobic monomers, in the polymerizable compositions to form silicon-free hydrogels. In silicone hydrogels, hydrophilic silicone-free monomer components include those that are capable of providing at least about 10% (w/w), or even at least about 25% (w/w) water content to the resulting hydrated lens when combined with the other polymerizable composition components. For silicone hydrogels, the total silicone-free monomers can be from about 25% (w/w) to about 75% (w/w), or from about 35% (w/w) to about 65% (w/w), or from about 40% (w/w) to about 60% (w/w), of the polymerizable composition.

Monomers that may be included as the silicone-free monomers typically possess at least one polymerizable double bond, at least one hydrophilic functional group, or both. Examples of polymerizable double bonds include, for example, vinyl, acrylic, methacrylic, acrylamido, methacrylamido, fumaric, maleic, styryl, isopropenylphenyl, O-vinylcarbonate, O-vinylcarbamate, allylic, O-vinylacetyl and N-vinyl lactam and N-vinylamido double bonds. In one example, the hydrophilic monomers are vinyl-containing (e.g., an acrylic containing monomer or a non-acrylic vinyl containing monomer). Such hydrophilic monomers may themselves be used as crosslinking agents.

Such hydrophilic silicone-free monomers may be but are not necessarily crosslinking agents. Considered as a subset of acryloyl moieties as described above, an "acrylic-type" or "acrylic-containing" or acrylate-containing monomer is a monomer containing the acrylic group (CR'H=CRCOX) wherein R is H or $CH_3$, R' is H, alkyl, or carbonyl, and X is O or N, which are also known to polymerize readily.

For silicone hydrogels, the hydrophilic silicone-free component can comprise non-silicon containing monomer components comprising an acrylic monomer (e.g., a monomer with a vinyl group at the α-carbon position and a carboxylic acid terminus, a monomer with a vinyl group at the α-carbon position and an amide terminus, etc.) and hydrophilic vinyl-containing ($CH_2$=CH—) monomer (i.e., a monomer containing a vinyl group that is not part of an acrylic group).

Illustrative acrylic monomers include N,N-dimethylacrylamide (DMA), 2-hydroxyethyl acrylate, glycerol methacrylate, 2-hydroxyethyl methacrylate (HEMA), methacrylic acid, acrylic acid, methylmethacrylate (MMA), ethylene glycol methyl ether methacrylate (EGMA), and any mixtures thereof. In one example, the total acrylic monomer content is in an amount ranging from about 5% (w/w) to about 50% (w/w) of the polymerizable composition used to prepare a silicone hydrogel lens product, and can be present in an amount ranging from about 10% (w/w) to about 40% (w/w), or from about 15% (w/w) to about 30% (w/w), of the polymerizable composition.

As described above, the silicone-free monomers also can comprise a hydrophilic vinyl-containing monomer. Hydrophilic vinyl-containing monomers that may be incorporated into the materials of the present lenses include, without limitation, the following: N-vinyl lactams (e.g. N-vinyl pyrrolidone (NVP)), N-vinyl-N-methyl acetamide (VMA), N-vinyl-N-ethyl acetamide, N-vinyl-N-ethyl formamide, N-vinyl formamide, N-2-hydroxyethyl vinyl carbamate, N-carboxy-β-alanine N-vinyl ester and the like and mixtures thereof. One example of a vinyl-containing monomer is N-vinyl-N-methyl acetamide (VMA). The structure of VMA corresponds to $CH_3C(O)N(CH_3)$—CH=$CH_2$. In one example, the total vinyl-containing monomer content of the polymerizable composition is in an amount ranging from about 0% to about 50% (w/w), e.g., up to about 50% (w/v), of the polymerizable composition used to prepare the silicone hydrogel lens product, and can be present in an amount ranging from about 20% (w/w) to about 45% (w/w), or from about 28% (w/w) to about 40% (w/w), of the polymerizable composition. Other silicone-free lens-forming hydrophilic monomers known in the art also may be suitable.

Crosslinking agents useful in producing the present contact lenses, such as the present silicone hydrogel contact lenses include, without limitation, the above-indicated crosslinking agents. Examples of acrylate-functionalized ethylene oxide oligomers for use in crosslinking agents can include oligoethylene oxide dimethacrylate. The crosslinking agent can be TEGDMA, TEGDVE, EGDMA, TMGDMA, or any combinations thereof. Typically, the crosslinking agents are present in the polymerizable silicone hydrogel composition in relatively small total amounts in the polymerizable composition, such as in an amount ranging from about 0.1% (w/w) to about 10% (w/w), or from about 0.5% (w/w) to about 5% (w/w), or from about 0.75% (w/w) to about 1.5% (w/w), by weight of the polymerizable composition.

Additional Hydrogel Components.

The silicone hydrogel lens polymerizable compositions described herein can also include additional components, e.g., one or more initiators, such as one or more thermal initiators, one or more ultraviolet (UV) initiators, visible light initiators, combinations thereof, and the like, one or more UV absorber agents or compounds, or UV radiation or energy absorber, tinting agent, pigments, release agents, antimicrobial compounds, and/or other additives. The term "additive" in the context of the present application refers to a compound or any chemical agent provided in the present hydrogel contact lens polymerizable compositions or the polymerized hydrogel contact lens products, but which is not necessary for the manufacture of a hydrogel contact lens.

The polymerizable compositions may comprise one or more initiator compounds, i.e., a compound capable of initiating polymerization of a polymerizable composition. Thermal initiators, i.e., initiators having a "kick-off" temperature, can be used. For instance, one exemplary thermal initiator employed in the present polymerizable compositions of the invention is 2,2'-azobiz(isobutyronitrile) (VAZO®-64). VAZO®-64 possesses a kick-off temperature of about 62° C., which is the temperature at which the reactive components in the polymerizable composition will begin to polymerize. Another thermal initiator is 2,2'-azobis(2,4-dimethylpentanenitrile) (VAZO®-52), possesses a kick-off temperature of about 50° C. Yet another thermal initiator for use in the compositions of the invention is azo-bis-isobutyronitrile (VAZO®-88), which has a kick-off temperature of about 90° C. All of the VAZO thermal initiators described herein are available from DuPont (Wilmington, Del., USA). Additional thermal initiators include such as 1,1'-azobis(cyclohexanecarbonitrile) and 2,2'-azobis(2-methylpropionitrile), as well as other types of initiators such as those available from Sigma Aldrich. Ophthalmically compatible silicone hydrogel contact lenses can be obtained from polymerizable compositions that comprise from about 0.05% (w/w) to about 0.8% (w/w), or from about 0.1% (w/w) to about 0.6% (w/w), of VAZO®-64 or other thermal initiator.

A UV absorber may be, e.g., a strong UV absorber that exhibits relatively high absorption values in the UV-A range of about 320-380 nanometers, but is relatively transparent above about 380 nm. Examples include photopolymerizable hydroxybenzophenones and photopolymerizable benzotriazoles, such as 2-hydroxy-4-acryloyloxyethoxy benzophenone, commercially available as CYASORB UV416 from Cytec Industries, West Paterson, N.J., USA, 2-hydroxy-4-(2 hydroxy-3-methacryIyloxy)propoxybenzophenone, and photopolymerizable benzotriazoles, commercially available as NORBLOC® 7966 from Noramco, Athens, Ga., USA. Other photopolymerizable UV absorbers suitable for use in accordance with the present invention include polymerizable, ethylenically unsaturated triazines, salicylates, aryl-substituted acrylates, and mixtures thereof. Generally speaking, a UV absorber, if present, is provided in an amount corresponding to about 0.5 weight percent of the polymerizable composition to about 1.5 weight percent of the composition. For example, compositions can include from about 0.6% (w/w) to about 1.0% (w/w) of one or more UV absorbers.

The polymerizable compositions useful in accordance with the present invention may also include a tinting agent, although both tinted and clear lens products are contemplated. In one example, the tinting agent is a reactive dye or pigment effective to provide color to the resulting lens product. Tinting agents can include, for example, VAT Blue 6 (7,16-Dichloro-6,15-dihydroanthrazine-5,9,14,18-tetrone), 1-Amino-4-[3-(beta-sulfatoethylsulfonyl)anilio]-2-anthraquinonesulfonic acid (C. I. Reactive Blue 19, RB-19), a copolymer of Reactive Blue 19 and hydroxyethylmethacrylate (RB-19 HEMA) 1,4-bis[4-[(2-methacryl-oxyethyl)phenylamino]anthraquinone (Reactive Blue 246, RB-246, available from Arran Chemical Company, Athlone, Ireland), 1,4-Bis[(2-hydroxyethyl)amino]-9,10-anthracenedione bis(2-propenoic)ester (RB-247), Reactive Blue 4, RB-4, or a copolymer of Reactive Blue 4 and hydroxyethyl methacrylate (RB-4 HEMA or "Blue HEMA"). Other exemplary tinting agents are disclosed for example, in U.S. Patent Application Publication No. 2008/0048350, the disclosure of which is incorporated in its entirety herein by reference. Other suitable tinting agents for use in accordance with the present invention are phthalocyanine pigments such as phthalocyanine blue and phthalocyanine green, chromic-alumina-cobaltous oxide, chromium oxides, and various iron oxides for red, yellow, brown and black colors. Opaquing agents such as titanium dioxide may also be incorporated. For certain applications, a mixture of colors may be employed. If employed, tinting agents can be present in an amount ranging from about 0.1% (w/w) to about 15% (w/w), or about 1% (w/w) to about 10% (w/w), or about 4% (w/w) to about 8% (w/w).

The polymerizable compositions may also comprise a demolding aid, that is to say, one or more ingredients effective in making more facile removal of the cured contact lenses from their molds. Exemplary demolding aids include hydrophilic silicones, polyalkylene oxides, and combinations thereof. The polymerizable compositions may additionally comprise a diluent selected from the group consisting of hexanol, ethoxyethanol, isopropanol (IPA), propanol, decanol and combinations thereof. Diluents, if employed, are typically present in amounts ranging from about 10% (w/w) to about 30% (w/w). Compositions having relatively higher concentrations of diluents tend to, but do not necessarily, have lower ionoflux values, reduced modulus, and increased elongation, as well as water break up times (WBUTs) greater than 20 seconds. Additional materials suitable for use in making hydrogel contact lenses are described in U.S. Pat. No. 6,867,245, the disclosure of which is incorporated in its entirety herein by reference. In certain embodiments however, the polymerizable composition is diluent-free.

Preparation Methods for Lenses.

Various Processes are known for curing a polymerizable composition in the production of contact lenses, including spincasting and static casting. Spincasting methods involve charging the polymerizable composition to a mold, and spinning the mold in a controlled manner while exposing the polymerizable composition to UV light. Static casting methods involve providing the polymerizable composition between two mold sections, one mold section shaped to form the anterior lens surface and the other mold section shaped to form the posterior lens surface, and curing the polymerizable composition by exposure to UV light, heat, visible light, or other radiation. Additional details and methods for forming contact lenses can be found, for example, in U.S. Patent Application Publication Nos. 2007/0296914 and 2008/0048350, the disclosure of each of which is incorporated in its entirety herein by reference.

After curing the reaction mixture, the resulting polymer is separated from the mold. In some situations, such as static cast molding, the two mold members are first separated before separating the polymer from the mold.

The resulting polymer can also be treated with a washing liquid, including but not limited to water, aqueous solutions, organic solvents, and aqueous solutions including an organic solvent. The washing treatment can be used to remove diluent (if used), unreacted components, byproducts, and the like, and hydrate the polymer to form a water swollen hydrogel. Lenses made using the presently useful polymerizable formulations or compositions do not require extraction with organic solvents, or aqueous solutions containing organic solvents prior to hydration and packaging. The lenses, without organic solvent extraction may be washed with water or an aqueous solution such as physiological saline or an aqueous solution of a surfactant or a surfactant component. Depending on the solubility characteristics of the diluent, if any, and residual unpolymerized monomers, the solvent initially used can be an organic liquid such as ethanol, methanol, isopropanol, mixtures thereof, or the like, or a mixture of one or more organic liquids with water, followed by extraction with pure water (or physiological saline or a surfactant solution) to produce the silicone hydrogel comprising a polymer swollen with water. In one embodiment, no diluent is present in or with the polymerizable composition. In any event, during or after the washing, the lens is hydrated in water or an aqueous solution, such as a packaging solution. It will be understood that when a lens is washed with an aqueous solution, as described herein, it will become at least partially hydrated. The washing/extraction process, the hydration process, or both the washing/extraction and hydration processes can be carried out using a heated liquid, a pressurized liquid, or a liquid under a vacuum. The silicone hydrogels after hydration can comprise 20% (w/w) to 80% (w/w) water, for example, 30% (w/w) to 70% (w/w) water, or 40% (w/w) to 60% (w/w) water of the total weight of the hydrogel.

Exemplary Polymerizable Compositions.

The monomers of the presently useful polymerizable compositions may be polymerized alone or copolymerized with other monomers to give a contact lens material.

TABLE I

Silicone Hydrogel Contact Lens Material Formulation

| Component | Examples | Wt/wt % |
|---|---|---|
| (a) First Monomer, Macromer or Prepolymer (i.e., silicone-containing) (used alone or in combination with (b)) | (Structure (B)) | 10%-45% |
| (b) Second Monomer, Macromer or Prepolymer (i.e., silicone containing) (used alone or in combination with (a)) | (Structure (A)) | 10%-40% |
| (c) Silicone-free Monomer (i.e., hydrophilic or hydrophobic) | (See Table II) | 30%-90% |
| (d) Cross-linking Agent | (See Table III) | 0%-10% |
| (e) Polymerization Initiator | (See Table IV) | 0%-5% |

TABLE II

Silicone-free Monomers

| N,N-dimethylacrylamide | "DMA" |
|---|---|
| Methyl methacrylate | "MMA" |
| N-vinyl-N-methylacetamide | "VMA" |
| ethylene glycol methyl ether methacrylate | "EGMA" |
| methoxy polyethyleneglycol methacrylate | "MPEGMA" |

TABLE III

Crosslinkers

| triethyleneglycol dimethacrylate | "TEGDMA" |
|---|---|
| ethyleneglycol dimethacrylate | "EGDMA" |
| triallyl isocyanurate | "TAIC" |
| trimethylene glycol dimethacrylate | "TMGDMA" |
| triethylene glycol divinyl ether | "TEGDVE" |
| vinyl methacrylate | "VM" |
| pentaerythritol triacrylate | "PTA" |
| trimethylolpropane trimethacrylate | "TPTMA" |

TABLE IV

Polymerization Initiators

| 2,2'-azobis(2,4-dimethylpentanenitrile) | "VAZO-52" |
|---|---|
| 2,2'-azobis(2-methylpropanenitrile) | "VAZO-64" |

Copolymers can be prepared by combining one or more silicone-containing monomers, macromers or prepolymers, for example first and second silicone-containing monomers, macromers or prepolymers, such as combining Structure (A) and (B) monomers, macromers or prepolymers, with one or more silicone-free monomers, such as those described in Table II and a cross-linking agent, such as those described in Table III. A polymerization initiator, such as those described in Table IV, is added to the mixture.

The copolymers are prepared in the form of contact lenses using suitable lens molds, for example, made of a non-polar material, such as polypropylene, e.g., a nucleated thermoplastic polypropylene resin, or in the form of films made between Teflon-lined glass slides, by first combining the components listed in Table I. The monomer mixtures are dispensed into molds or the slide cavities and then the initiator is "kicked-off", for example, by heating to the appropriate kick-off temperature. After completion of molding, the molds are opened, and the polymers are separated from the molds. The lenses are then contacted with water or an aqueous solution, as discussed elsewhere herein, to wash the lenses. The lenses can be hydrated in water or an aqueous solution, as discussed elsewhere herein. The lenses then can be packaged in blisters or blister packs, such as blisters using a PBS solution. The present contact lens bodies are not subjected to a form of plasma treatment and/or are not treated with a polymerizable swelling agent after the lens body is formed.

The present contact lenses can have acceptable wettability as shown, for example, by various properties thereof such as, for example, advancing contact angle, water break up time (WBUT), uptake of wetting solution, and other techniques.

The contact lenses can have at least one of the anterior surface and the posterior surface of the lens body when wet comprising a plurality of depressions with an average diameter between about 150 nanometers and less than 1500 nanometers, or a plurality of depressions with an average diameter between about 130 nanometers and less than about 630 nanometers, or a plurality of depressions with an average diameter between about 150 nanometers and less than about 550 nanometers.

The plurality of depressions may have an average depth from about 4 nanometers to about 100 nanometers, or the plurality of depressions may have an average depth from about 4 nanometers to about 4 nanometers, from about 4 nanometers to about 40 nanometers, or the plurality of depressions may have an average depth from about 4 nanometers to about 20 nanometers. In one embodiment, the plurality of depressions may have an average depth from about 8 nanometers to about 20 nanometers, or the plurality of depressions may have an average depth from about 15 nanometers to about 90 nanometers.

The contact lenses in accordance with the present invention can have an average surface roughness from about 5 nanometers root mean square (RMS) to about 30 nanometers RMS, or the average surface roughness can be from about 7 nanometers RMS to about 25 nanometers RMS, or the average surface roughness can be from about 10 nanometers RMS to about 20 nanometers RMS.

The plurality of depressions may have a density or an average density, meaning the number of depressions per 900 square micrometers of surface or the average number of depressions per 900 square micrometers of surface, of from about 5 depressions per 900 square micrometers of surface to about 1500 depressions per 900 square micrometers of surface, or the plurality of depressions may have an average density of from about 80 depressions per 900 square micrometers of surface to about 1500 depressions per 900 square micrometers of surface, or the plurality of depressions may have an average density of from about 200 depressions per 900 square micrometers of surface to about 1000 depressions per 900 square micrometers of surface. In one embodiment, the plurality of depressions may have an average density of from about 100 depressions per 900 square micrometers of surface to about 1200 depressions per 900 square micrometers of surface.

The present contact lenses, immediately following hydration in water or an aqueous solution, may have at least one of the anterior surface and the posterior surface of the lens body which has an advancing contact angle of less than 100° and a water breakup time (WBUT) of greater than five (5) seconds. A contact lens of the present invention may have, at least 12 hours after hydration in water or an aqueous solution, at least one of the anterior surface and the posterior surface of the lens body which has an advancing contact angle of less than 100° and a water breakup time of greater than five (5) seconds. In one embodiment, immediately following hydration in water and the aqueous solution, at least one of the anterior surface and the posterior surface of the lens body has an advancing contact angle of less than 100° and a water breakup time of greater than 5 seconds and at least 12 hours after hydration in water or the aqueous solution at least one of the anterior surface and the posterior surface of the lens body has an advancing contact angle of less than 100° and a water breakup time of greater than 5 seconds.

The contact lenses in accordance with the present invention may have, immediately following hydration in water or in aqueous solution, at least one of the anterior surface and posterior surface of the lens body having a first advancing contact angle which differs by no more than 30° from a second advancing contact angle of the anterior surface or the posterior surface of the lens body at least 12 hours after hydration in water or the aqueous solution, or a first advancing contact angle which differs by no more than 20° from a second advancing contact angle of the anterior surface or the posterior surface of the lens body at least 12 hours after hydration in water or the aqueous solution, or a first advancing contact angle which differs by no more than 10° from a second advancing contact angle of the anterior surface or the posterior surface of the lens body at least 12 hours after hydration in water or the aqueous solution.

The present contact lenses may have, immediately following hydration in water or an aqueous solution, the anterior surface or the posterior surface of the lens body having a first water breakup time which differs by no more than seconds from a second water breakup time of the anterior surface or the posterior surface of the lens body at least 12 hours after hydration in water or the aqueous solution or a first water breakup time which differs by no more than 10 seconds from a second water breakup time of the anterior surface or the posterior surface of the lens body at least 12 hours after hydration in water or the aqueous solution, or a first water breakup time which differs by no more than 5 seconds from a second water breakup time of the anterior surface or the posterior surface of the lens body at least 12 hours after hydration in water or the aqueous solution.

Contact Lens Package.

A contact lens package is provided comprising the contact lens body, such as described above, and a packaging solution. The packaging solution can comprise a wetting agent or an agent to help prevent or eliminate the lens from sticking to the blister package such as, for example, a surfactant or a hydrophilic polymer. The surfactant can be a non-ionic surfactant such as polysorbate 80, a poloxamer, a poloxamine, or a saccharide. The hydrophilic polymer can be a form of polyvinylpyrrolidone, polyethyleneglycol, polyvinyl alcohol, or combinations thereof.

With respect to the contact lens package, the package can further comprise a base member with a cavity configured to hold the contact lens body and the packaging solution, and a seal attached to the base member configured to maintain the contact lens and the packaging solution in a sterile condition for a duration of time equivalent to a shelf life of the contact lens.

EXAMPLES

The following non-limiting examples illustrate certain aspects of the present invention.

The following abbreviations and corresponding compounds and structures are used in the examples.

MCR-M07=A monomethacryloxypropyl terminated polydimethylsiloxane, as previously illustrated (Gelest, Morrisville, Pa., USA).

MCS-M11=A monomethacryloxypropyl terminated polydimethylsiloxane (Gelest, Morrisville, Pa., USA). A structure thereof is:

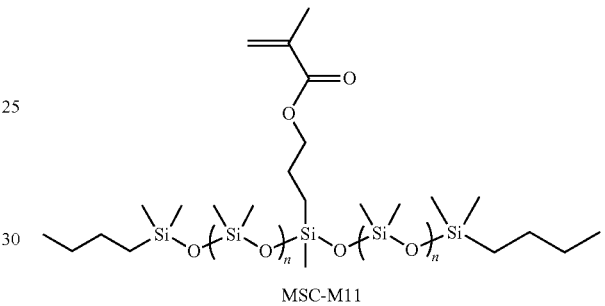

MSC-M11

FMM=A silicone-containing component as previously illustrated (Shin-Etsu Silicones of America, Akron, Ohio, USA).

M5A=A silicone-containing component the same as, or similar in structure to, hydrophilic polysiloxane macromonomer A described in Example 2 of U.S. Patent Application Publication No. 2009/0234089 (Asahi Kasei Aime Co., Ltd., Kanagawa, Japan).

X22-1622=A silicone-containing component as previously illustrated (Shin-Etsu Silicones of America, Akron, Ohio, USA).

X22-1625=A silicone-containing component as previously illustrated (Shin-Etsu Silicones of America, Akron, Ohio, USA).

SiGMA=(3-Methacryloxy-2-hydroxypropyloxy) propyl-bis(trimethylsiloxy)methylsilane. A structure thereof is:

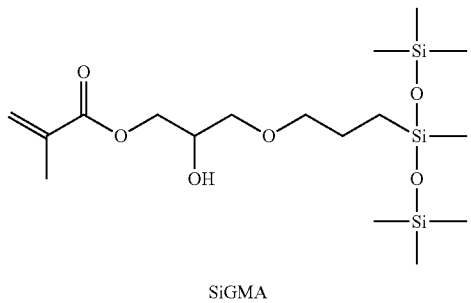

SiGMA

Tris=3-[Tris(trimethylsilyloxy)silyl]propyl methacrylate. A structure thereof is:

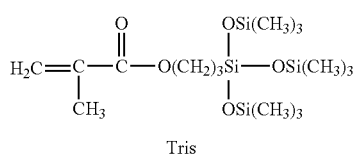

Tris

DMS-R18=A methacryloxypropyl terminated polydimethylsiloxane, as previously illustrated (Gelest, Morrisville, Pa., USA).
DMA=N,N-Dimethylacrylamide.
VMA=N-Vinyl-N-methylacetamide.
MMA=Methyl methacrylate.
HEMA=hydroxyethyl methacrylate.
EGMA=Ethylene glycol methyl ether methacrylate.
EGDMA=Ethylene glycol dimethacrylate.
TEGDMA=Tri(ethylene glycol)dimethacrylate.
TEGDVE=Tri(ethylene glycol)divinyl ether.
VAZO® 64=2,2'-Azobiz(isobutyronitrile).
PBS=phosphate buffered saline (20 mM, pH=7.3)
MPC=2-methacryloyloxyethyl phosphorylcholine (HEMA-PC, LIPIDURE®, NOF Corporation, Tokyo, Japan).
VB6=VAT Blue 6 (7,16-Dichloro-6,15-dihydroanthrazine-5,9,14,18-tetrone).
EHMA=2-Ethylhexyl methacrylate
IBM=Isobornyl methacrylate
AE=Alloxy ethanol Preparation of Contact Lenses Polymerizable lens compositions were prepared by mixing various combinations of the ingredients and components as indicated by some of the Table AB below. The lens formulations were formed into lenses in the following general manner.

Contact lens molds were injection molded from non-polar polypropylene resin using conventional injection molding techniques and equipment. Each contact lens mold included a female mold member that includes a concave optical quality surface for forming the front surface of the contact lens, and a male mold member that includes a convex optical quality surface for forming the back surface of the contact lens. The female mold member can be understood to be a front surface mold, and the male mold member can be understood to be a back surface mold.

An amount (about 60 μl) of the polymerizable lens composition was placed on the concave surface of the female mold member. The male mold member was placed in contact with the female mold member such that the polymerizable lens composition was located in a contact lens shaped cavity formed between the concave surface of the female mold member and the convex surface of the male mold member. The male mold member was held in position by an interference fit between a peripheral region of the female and male mold members.

The contact lens mold containing the polymerizable lens composition was then placed in an oven where the polymerizable lens composition was cured at a temperature of about 100° C. for about 30 minutes. After curing, the contact lens mold contained a polymerized contact lens product within the contact lens shaped cavity.

The contact lens mold was removed from the oven and allowed to cool to room temperature (about 20° C.). The contact lens mold was mechanically demolded to separate the male and female mold members from each other. The polymerized contact lens product remained attached to the male mold member.

The polymerized contact lens product was then mechanically delensed from the male mold member to separate the contact lens product from the male mold member.

The separated contact lens product was then washed in water, hydrated in PBS and subjected to various test procedures to characterize the hydrated contact lens product. In certain instances, the contact lens product was tested dry, that is with the contact lens product in the dry state, e.g. prior to washing, extraction or hydration, or after drying to remove retained water or solvent.

Methods for Characterizing Lens Products

The topography of the anterior and posterior surfaces of the contact lens products, in particular the contact lens bodies of such products, was analyzed using atomic force microscopy (AFM). The instrument employed was a Veeco Model CP II Atomic Force Microscope, sold by Veeco Instrument, Inc., Santa Barbara, Calif. USA. This instrument was used running in tapping mode, with a scan rate of 0.5 Hz and scan sizes of 10×10 microns, 20×20 microns, 30×30 microns and 40×40 microns. The data was analyzed using the following software: Image analysis version 2.1 provided by Veeco Instrument, Inc.

The Following Procedure was Followed:

The Veeco CP II atomic force microscopy running in tapping mode was utilized to take the dry and wet lens images. The wet lenses tested were in PBS solution. For specific lens type, 3 lenses were tested to take the atomic force microscopy (AFM) images. At least 3 different areas were scanned on one lens sample to collect the AFM data. A wet lens sample was taken out of vial or blister package, and mounted on top of a polypropylene mold submerged in PBS solution. Surface topography images were subsequently taken in a liquid environment at different scanning sizes (10 μm×10 μm, 20 μm×20 μm, 30 μm×30 μm, 40 μm×40 μm) with a scan rate of 0.5 Hz. Dry lens samples was fixed on a clean stainless steel wafer using double-sided carbon tape and tested in a dry condition at different scanning sizes (10 μm×10 μm, 20 μm×20 μm, 30 μm×30 μm, 40 μm×40 μm) with a scan rate of 0.5 Hz. The surface depressions were further analyzed using Image Analysis v2.1 (Veeco Instrument Inc.). The surface depression distribution or periodicity number was counted from the AFM images in a 30 μm×30 μm area. 50 surface depressions were further analyzed to obtain the average diameter and average depth of the depression in the AFM images. In addition, the root mean square (RMS) roughness was calculated using the same software for different lens types.

Water Break Up Time (WBUT). Prior to testing, a lens is soaked in 3 ml of fresh PBS for at least 24 hours. Immediately before testing, the lens is shaken to remove excess PBS, and the length of time in seconds that it takes for the water film to recede from the lens surface is determined (e.g., water break up time (water BUT, or WBUT)).

Advancing Contact Angle. The advancing contact angle can be determined using routine methods known to persons of ordinary skill in the art. For example, the advancing contact angles of the contact lenses provided herein can be measured using a captive bubble method. Advancing contact angles of silicone hydrogel contact lenses can be determined using a Kruss DSA 100 instrument (Kruss GmbH, Hamburg), and as described in D. A. Brandreth: "Dynamic contact angles and contact angle hysteresis", Journal of Colloid and Interface Science, vol. 62, 1977, pp. 205-212 and R. Knapikowski, M. Kudra: Kontaktwinkelmessungen nach dem Wilhelmy-Prinzip-Ein statistischer Ansatz zur Fehierbeurteilung", Chem. Technik, vol. 45, 1993, pp. 179-185, and U.S. Pat. No. 6,436,481, all of which are incorporated in their entireties herein by reference.

As an example, the advancing contact angle can be determined using a captive bubble method using phosphate buffered saline (PBS; pH=7.2). Prior to testing, the lens is soaked in pH 7.2 PBS solution for at least 30 minutes or overnight. The lens is flattened onto a quartz surface and rehydrated with PBS for 10 minutes before testing. An air bubble is placed onto a lens surface using an automated syringe system. The size of the air bubble can be increased and decreased to obtain the receding angle (the plateau obtained when increasing the bubble size) and the advancing angle (the plateau obtained when decreasing the bubble size).

Static Contact Angle. Static Contact Angle can be determined using routine methods known to persons of ordinary skill in the art. For example, the Static Contact Angle can be determined using a captive bubble method, or using a DSA 100 drop shape analysis system (Kruss, Hamburg, Germany). Prior to testing, the lens is soaked in pH 7.2 PBS solution for at least 30 minutes or overnight.

Modulus. The modulus of a lens body can be determined using routine methods known to persons of ordinary skill in the art. For example, pieces of a contact lens having about 4 mm width can be cut out from a central part of a lens, and modulus (unit; MPa) can be determined from an initial slope of a stress-strain curve obtained by the tensile test at the rate of 10 mm/min in air at a humidity of at least 75% at 25° C., using an Instron 3342 (Instron Corporation, Norwood, Mass., USA).

Ionoflux. The ionoflux of the lens bodies of the present lenses can be determined using routine methods known to persons of ordinary skill in the art. For example, the ionoflux of a contact lens or lens body can be measured using a technique substantially similar to the "Ionoflux Technique" described in U.S. Pat. No. 5,849,811. For example, the lens to be measured can be placed in a lens-retaining device, between male and female portions. The male and female portions include flexible sealing rings which are positioned between the lens and the respective male or female portion. After positioning the lens in the lens-retaining device, the lens-retaining device is placed in a threaded lid. The lid is screwed onto a glass tube to define a donor chamber. The donor chamber can be filled with 16 ml of 0.1 molar NaCl solution. A receiving chamber can be filled with 80 ml of deionized water. Leads of the conductivity meter are immersed in the deionized water of the receiving chamber and a stir bar is added to the receiving chamber. The receiving chamber is placed in a thermostat and the temperature is held at about 35° C. Finally, the donor chamber is immersed in the receiving chamber. Measurements of conductivity can be taken every 2 minutes for about 20 minutes, starting 10 minutes after immersion of the donor chamber into the receiving chamber. The conductivity versus time data should be substantially linear.

Tensile Strength. The tensile strength of a lens body can be determined using routine methods known to persons of ordinary skill in the art. For example, pieces of a contact lens having about 4 mm width can be cut out from a central part of a lens, and tensile strength (unit; MPa) can be determined from testing using an Instron 3342 (Instron Corporation, Norwood, Mass., USA).

Elongation. The elongation of a lens body can be determined using routine methods known to persons of ordinary skill in the art. For example, the elongation (%) can be determined using an Instron 3342 (Instron Corporation, Norwood, Mass., USA).

Oxygen Permeability (Dk). The Dk of the present lenses can be determined using routine methods known to persons of ordinary skill in the art. For example, the Dk value can be determined using a modified polargraphic method, as described in *A single-lens polarographic measurement of oxygen permeability (Dk) for hypertransmissible soft contact lenses*, M. Chhabra et al., Biomaterials 28 (2007) 4331-4342.

Equilibrium Water Content (EWC). The water content of the present lenses can be determined using routine methods known to persons of ordinary skill in the art. For example, a hydrated silicone hydrogel contact lens can be removed from an aqueous liquid, wiped to remove excess surface water, and weighed. The weighed lens can then be dried in an oven at 80° C. under a vacuum, and the dried lens can then be weighed. The weight difference is determined by subtracting the weight of the dry lens from the weight of the hydrated lens. The water content (%) is the (weight difference/hydrated weight)×100.

Center Thickness of Lens (CT). The CT can be determined using routine methods known to persons of ordinary skill in the art. For example, the CT can be determined using a Rehder ET gauge (Rehder Development Company, Castro Valley, Calif., USA).

A series of 16 contact lenses were formed and tested as described above. These 16 lenses were formed in polypropylene (nucleated) molds from the polymerizable compositions listed in Table AB.

TABLE AB

| Ingredient (unit wt parts) | Form. No. | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| | Form. ID | | | | | | | | | | | | | | | |
| | F-03 | F-00 | X2-17 | PCS-15 | PCS-42 | X5S-05 | R7-09 | R7-36 | RF-16 | S-42 | S-62 | S-83 | S-84 | S-158 | DM-004 | SUS-DF4 |
| MCR-M07 | | | | | | | 25 | 25 | 20 | | | | | | | |
| MCS-M11 | | 17 | | | | | | | | | | | | | | 20 |
| FMM | 33 | 16 | | 18 | 20 | 26 | | | 20 | 30 | 29 | 27 | 22 | 30 | 16 | |
| M5A | | | | | | | | | | 15 | 14 | 13 | 14 | 15 | | |
| X22-1622 | | | 30 | | | | | | | | | | | | | |
| X22-1625 | | | | | | 16 | | | | | | | | | | |
| SiGMA | | | | 25 | 20 | | 20 | 23 | | | | | | | | 20 |
| TRIS | | | | | | | | | | | | | | | 18 | |
| DMS-R18 | | | 3 | | | | | | | | | | | | | |
| NVP | | | | 40 | 49 | | | | | | | 50 | 50 | | 46 | |
| VMA | 34 | 34 | 45 | | | 44 | 40 | 45 | 50 | 45 | 43 | | | 45 | | 45 |
| DMA | 10 | 5 | | | | | 5 | 2 | | | | | | 5 | 5 | |

TABLE AB-continued

| Ingredient (unit wt parts) | Form. No. | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| | Form. ID | | | | | | | | | | | | | | | |
| | F-03 | F-00 | X2-17 | PCS-15 | PCS-42 | X5S-05 | R7-09 | R7-36 | RF-16 | S-42 | S-62 | S-83 | S-84 | S-158 | DM-004 | SUS-DF4 |
| MMA | 23 | 14 | 10 | | | 14 | 10 | 5 | 10 | 15 | 4 | 10 | 14 | 12 | | 10 |
| HEMA | | | | 10 | 5 | | | | | | | | | | 8 | |
| MPC | | | | 5 | 7 | | | | | | | | | | 4 | |
| EGMA | | | 12 | | | | | | | | 10 | | | | | |
| EHMA | | 14 | | | | | | | | | | | | 2 | | |
| BVE | | | | | | | | | | | | | | 6 | | |
| TEGDMA | 0.8 | 0.8 | 0.8 | 0.8 | 1.5 | | | 0.8 | 1.2 | | 0.1 | 0.1 | 0.1 | 0.15 | 0.9 | 0.8 |
| TEGDVE | | | | 0.8 | 0.5 | 0.4 | 0.1 | 0.4 | 0.2 | | 0.2 | 0.4 | 0.4 | 0.1 | | |
| EGDMA | | | | | | | 0.6 | | | | | | | | | |
| IBM | | | | | | | | | | | | | | | 6 | |
| AE | | | | | | | | | | | | | | | | 0.3 |
| Vazo 64 | 0.3 | 0.3 | 0.3 | 0.5 | 0.5 | 0.5 | 0.3 | 0.3 | 0.8 | 0.5 | 0.5 | 0.3 | 0.3 | 0.5 | 0.7 | |
| n-propanol | | | | 15 | 15 | | | | | | | | | | 13 | |

A series of commercially available silicone hydrogel contact lenses were also tested using AFM to analyze surface topography. These lenses include commercially available lenses which have not subjected to a form of plasma treatment as a part of their manufacturing processes, including AVAIRA® lenses and BIOFINITY® lenses (CooperVision, Pleasanton, Calif.), CLARITI™ lenses (Sauflon, Twickenham, UK) and the ACUVUE® OASYS™ lenses, ACUVUE® ADVANCE® lenses, and ACUVUE® TRUEYE™ lenses (Johnson & Johnson Vision Care, Inc., Jacksonville, Fla., USA). The lenses also include commercially available lenses which have been subjected to a form of plasma treatment as part of their manufacturing processes, including PUREVISION® lenses (Bausch & Lomb, Rochester, N.Y., USA), the PREMIO™ lenses (Menicon, JP), and the NIGHT & DAY® lenses, the O2OPTIX® lenses, and the AIR OPTIX® lenses (Ciba Vision, Duluth, Ga., USA).

Certain results of these AFM tests are shown in FIGS. 1-4, as well as in Table AC. In addition, FIGS. 5-18 show photos of the lens surfaces.

The size, depth and density of the depressions, as well as the RMS roughness of the anterior/posterior surfaces of each of the test lenses remained substantially the same, for example, ± between 10% and 15%, whether the AFM analysis was conducted immediately after hydration or 12 hours after hydration or 24 hours after hydration.

As shown in Table AC below, and FIG. 1, the average diameter of the surface depressions in the contact lenses produced from formulations 1-14 and 16 is in a range between 175.7 nm to 615.8 nm. Some of the formulations of the present invention have average diameters of surface depressions in the range, for example, between about 150 nm and about 1500 nm, between about 130 nm and about 630 nm, between about 150 nm and about 1500 nm, between about 170 nm and about 570 nm, between about 180 nm and about 380 nm, or between about 250 nm and about 390 nm. The contact lens from formulation 15 has an average depression diameter of 1174.6 nm. Of the commercially available lenses tested, the lenses which have not been subjected to a form of plasma treatment (i.e., the AVAIRA® lenses, the BIOFINITY® lenses, the CLARITI™ lenses and the ACUVUE® lenses) either have no detectable surface depressions or surface depressions with larger average diameters than the lenses from formulations 1-14 and 16. The lenses which have been subjected to a form of plasma treatment (i.e., the PUREVISION® lenses, the PREMIO™ lenses, the NIGHT & DAY® lenses, the O2OPTIX® lenses, and the AIR OPTIX® lenses) either have no surface depressions or surface depressions with somewhat larger average diameters, for example between about 400 nm and about 800 nm.

TABLE AC

| Formulation Number or Lens Name | Formulation ID or Lens Type | Average Diameter of Depression (nm) | Average Depth of Depression (nm) | Average RMS Surface Roughness (nm) | Density of Surface Depressions (Number per 900 square micrometer) |
|---|---|---|---|---|---|
| 1 | F-03 | 240.3 ± 37.6 | 9.6 ± 2.2 | 15.6 ± 2.6 | 477 |
| 2 | F-00 | 250.1 ± 32.4 | 10.1 ± 2.6 | 9.3 ± 0.5 | 549 |
| 3 | X2-17 | 535.8 ± 80 | 37.8 ± 10.3 | 10.4 ± 0.8 | 639 |
| 4 | PCS-15 | 313.1 ± 39.5 | 19.4 ± 4.4 | 17.3 ± 2.4 | 180 |
| 5 | PCS-42 | 327.6 ± 43.7 | 17.8 ± 4.8 | 15.4 ± 2.1 | 144 |
| 6 | X5S-05 | 291 ± 54.9 | 18.2 ± 7.8 | 11.3 ± 2.0 | 594 |
| 7 | R7-09 | 314.1 ± 56.3 | 30.6 ± 7.1 | 10.1 ± 0.6 | 1062 |
| 8 | R7-36 | 355.2 ± 90.1 | 25.1 ± 10.9 | 9.8 ± 0.6 | 945 |
| 9 | RF-16 | 262.7 ± 75.5 | 13.9 ± 2.9 | 13.4 ± 2.3 | 252 |
| 10 | S-42 | 273.3 ± 38.5 | 7.1 ± 1.8 | 9.1 ± 2 | 702 |
| 11 | S-62 | 193.1 ± 17.4 | 6.4 ± 1.3 | 12.2 ± 2 | 621 |
| 12 | S-83 | 212.2 ± 32.3 | 7.6 ± 1.6 | 8.5 ± 1.2 | 135 |
| 13 | S-84 | 202.4 ± 24.4 | 7.1 ± 1.2 | 9.4 ± 0.3 | 261 |
| 14 | S-158 | 230.2 ± 35.6 | 9.4 ± 2.5 | 9.3 ± 1.1 | 657 |
| 15 | DM-004 | 1174.6 ± 320.2 | 61.6 ± 20.1 | 14.4 ± 2.5 | 5 |
| 16 | SUS-DF4 | 386.3 ± 68.7 | 16.3 ± 6.4 | 9.1 ± 2.2 | 990 |
| Avaira | no plasma tmt | 1900 ± 400 | 41.7 ± 16.5 | 8.6 ± 0.8 | 4 |

TABLE AC-continued

| Formulation Number or Lens Name | Formulation ID or Lens Type | Average Diameter of Depression (nm) | Average Depth of Depression (nm) | Average RMS Surface Roughness (nm) | Density of Surface Depressions (Number per 900 square micrometer) |
|---|---|---|---|---|---|
| Biofinity | no plasma tmt | 1500 ± 200 | 23.2 ± 6.6 | 9.5 ± 0.8 | 4 |
| Acuvue Oasys | no plasma tmt | 0 ± 0 | 0 ± 0 | 7.1 ± 0.7 | 0 |
| Acuvue Advance | no plasma tmt | 0 ± 0 | 0 ± 0 | 6.2 ± 0.5 | 0 |
| Acuvue TruEye | no plasma tmt | 0 ± 0 | 0 ± 0 | 9.5 ± 2.7 | 0 |
| Clariti | no plasma tmt | 3000 ± 800 | 39.6 ± 8.3 | 9.2 ± 1.1 | 4 |
| PureVision | plasma tmt | 664.3 ± 72.5 | 51.2 ± 9.8 | 18 ± 1.7 | 549 |
| PremiO | plasma tmt | 583.8 ± 181.5 | 6.1 ± 2.0 | 7.8 ± 1.1 | 19 |
| Night & Day | plasma tmt | 0 ± 0 | 0 ± 0 | 10.5 ± 1.0 | 0 |
| O2Optix | plasma tmt | 0 ± 0 | 0 ± 0 | 11.9 ± 1.8 | 0 |
| Air Optix | plasma tmt | 0 ± 0 | 0 ± 0 | 17.7 ± 2.1 | 0 |

As shown in Table AC and FIG. 2, the average depth of the surface depressions in the contact lenses produced from formulations 1-14 and 16 is in a range between 5.1 nm and 48.1 nm. The contact lens from formulation 15 has an average surface depression depth of 61.6 nm. Some of the formulations of the present invention have average depths of the surface depressions in the range, for example, between about 4 nm and about 60 nm, between about 4 nm and about 20 nm, between about 8 nm and about 40 nm, between about 8 nm and about 20 nm, between about 15 nm and about 90 nm, or between about 15 nm and about 30 nm.

As shown in Table AC and FIG. 3, the surface depression distribution or density in the contact lenses produced from formulations 1-14 and 16 is in a range of between 135 and 1062 depressions per 900 $\mu m^2$. The contact lens of formulation 15 has a density of 5 depressions per 900 $\mu m^2$. Some of the formulations of the present invention have densities in a range between about 5 depressions per 900 $\mu m^2$ and about 1500 depressions per 900 $\mu m^2$, between about 80 depressions per 900 $\mu m^2$ and about 1500 depressions per 900 $\mu m^2$, between about 200 depressions per 900 $\mu m^2$ and about 1000 depressions per 900 $\mu m^2$, between about 100 depressions per 900 $\mu m^2$ and about 1200 depressions per 900 $\mu m^2$, between 2 depressions per 900 $\mu m^2$ and 700 depressions per 900 $nm^2$, or between about 100 depressions per 900 $\mu m^2$ and about 600 depressions per 900 $\mu m^2$. The commercially available lenses tested which were not subjected to a form of plasma treatment either have no surface depressions or have a surface depression density which is substantially lower than the lenses from formulations 1-14 and 16.

As shown in Table AC, and FIG. 4, the average RMS surface roughness of the contact lenses produced from formulations 1-16 is in a range between 6.9 and 19.7. Some of the formulations of the present invention have average RMS surface roughness in the range between about 5 nm and about 30 nm, between about 5 nm and about 20 nm, between about 5 nm and about 15 nm, between about 7 nm and about 25 nm, between about 10 nm and about 30 nm, between about 15 nm and 30 nm, or between 15 nm and about 20 nm. The commercially available lenses tested which had not been subjected to a form of plasma treatment had average RMS surface roughnesses that tended to be somewhat lower, for example in a range between about 5 nm and about 10 nm.

Further, Table AD below, includes results from property characterization tests of lenses made using the present formulations.

TABLE AD

| | Formulation ID | | | | | | | | |
|---|---|---|---|---|---|---|---|---|---|
| | 1 | 2 | 6 | 7 | 8 | 10 | 11 | 12 | 13 |
| Packaging solution | PBS | PBS | PBS | PBS | PBS | PBS | PBS | PBS | PBS |
| Static Contact Angle (CB) | 37.7 ± 0.2 | 37.1 ± 1.7 | 36.7 ± 0.1 | 36.3 ± 2.6 | 37 ± 1 | 35.8 ± 0.2 | 35.5 ± 0.1 | 34.4 ± 0.3 | 36.9 ± 0.8 |
| Adv. Contact Angle (CB) | 65.8 ± 1.6 | 80.4 ± 1.4 | 60.4 ± 2.8 | 66.8 ± 2.9 | 43 ± 1 | 42.9 ± 1.6 | 39.9 ± 0.4 | 41.9 ± 1.8 | 63.0 ± 0.5 |
| Modulus (MPa) | 0.75 ± 0.10 | 0.52 ± 0.03 | 0.55 ± 0.04 | 0.63 ± 0.01 | 0.64 ± 0.02 | 0.56 ± 0.02 | 0.56 ± 0.01 | 0.69 ± 0.02 | 0.70 ± 0.03 |
| Elongation (%) | 542 ± 149 | 473 ± 56 | 486 ± 117 | 277 ± 25 | 324 ± 10 | 528 ± 133 | 493 ± 32 | 425 ± 90 | 648 ± 26 |
| Tensile Strength (MPa) | 1.71 ± 0.67 | 2.07 ± 0.64 | 0.98 ± 0.26 | 1.32 ± 0.24 | 1.45 ± 0.13 | 1.17 ± 0.37 | 1.27 ± 0.15 | 1.34 ± 0.35 | 2.35 ± 0.16 |
| Water Content (%) | 56.02 ± 0.29 | 52.02 ± 0.21 | 56.94 ± 0.51 | 54.48 ± 0.67 | 57.54 ± 0.21 | 56.84 ± 0.67 | 58.42 ± 0.32 | 55.18 ± 0.44 | 56.24 ± 0.47 |
| Dk (Dk/t) | 67 ± 2 | 58 ± 4 | 101 ± 2 | 84 ± 8 | 78 ± 8 | 92 ± 4 | 104 ± 4 | 93 ± 5 | 78 ± 1 |
| Ionoflux (10 − 3 mm2/min) | 6.54 ± 0.35 | 4.59 ± 0.07 | 8.01 ± 0.25 | 2.56 ± 0.10 | 0.05 ± 0.01 | 7.38 ± 0.39 | 7.40 ± 0.11 | 5.16 ± 0.21 | 7.40 ± 0.31 |
| Wet Extractables (%) | 3.71 ± 0.19 | 6.22 ± 0.20 | 2.62 ± 0.39 | 4.62 ± 0.13 | 4.11 ± 0.26 | 2.84 ± 0.71 | 3.09 ± 0.37 | 2.84 ± 0.34 | 2.87 ± 0.29 |
| Lens Clarirty | good | good | good | good | good | good | good | good | good |

FIGS. 5-18 comprise a set of photographs showing the lens surface morphology as determined by atomic force microscopy (AFM) using the tapping mode. FIGS. 5-10 show the lenses produced from formulations 1-16 after hydration in PBS. FIGS. 11-14 show photographs of the morphology of various commercially available lenses, including AVAIRA®, BIOFINITY®, CLARITI™, PREMIO™, PUREVISION®, ACUVUE® OASYS™, ACUVUE® ADVANCE®, ACUVUE® TRUEYE™, NIGHT & DAY® O2OPTIX®, and AIR OPTIX® lenses as determined using tapping mode AFM after hydrating the lenses in PBS.

Figure 17:
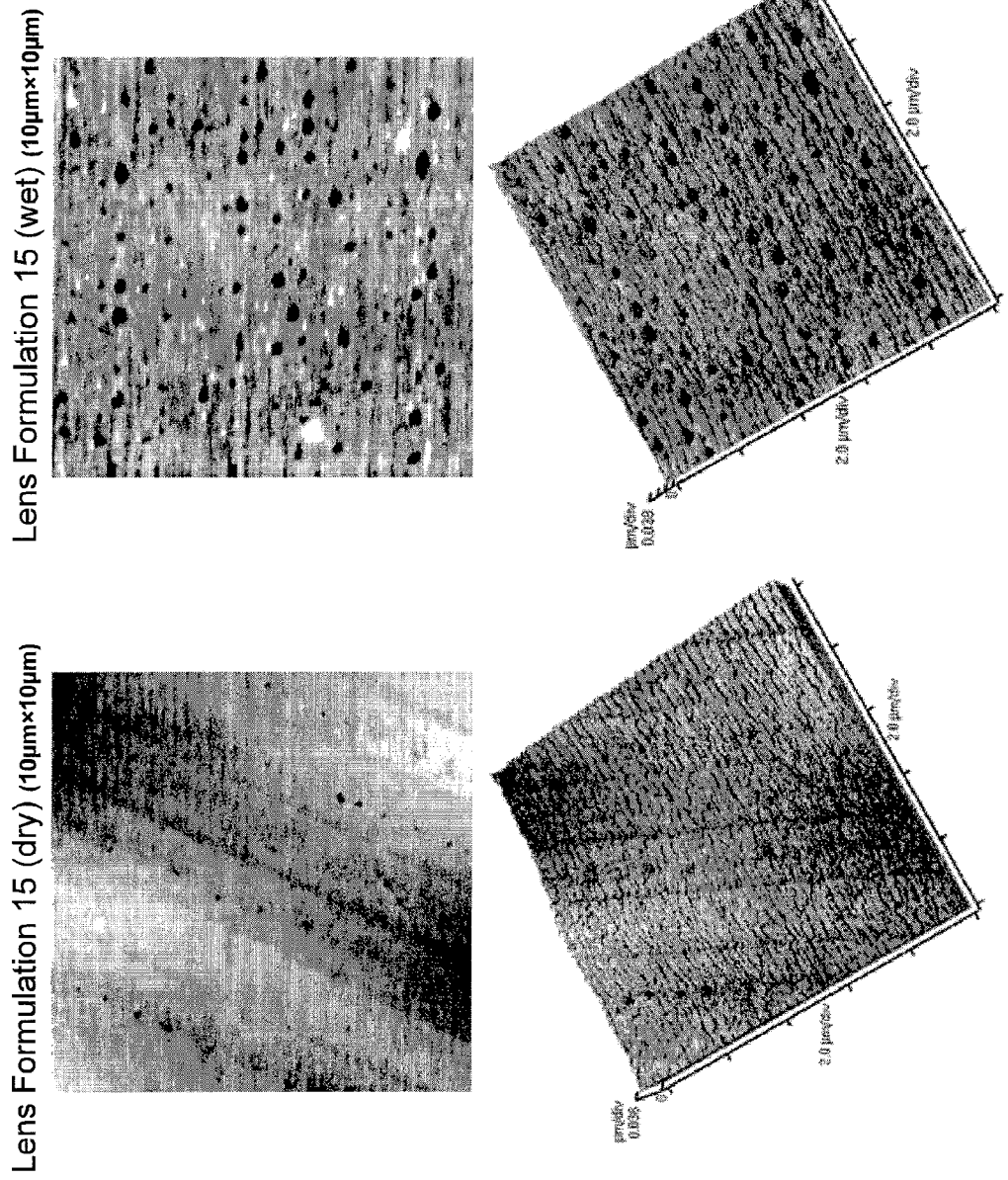
Figure 18:
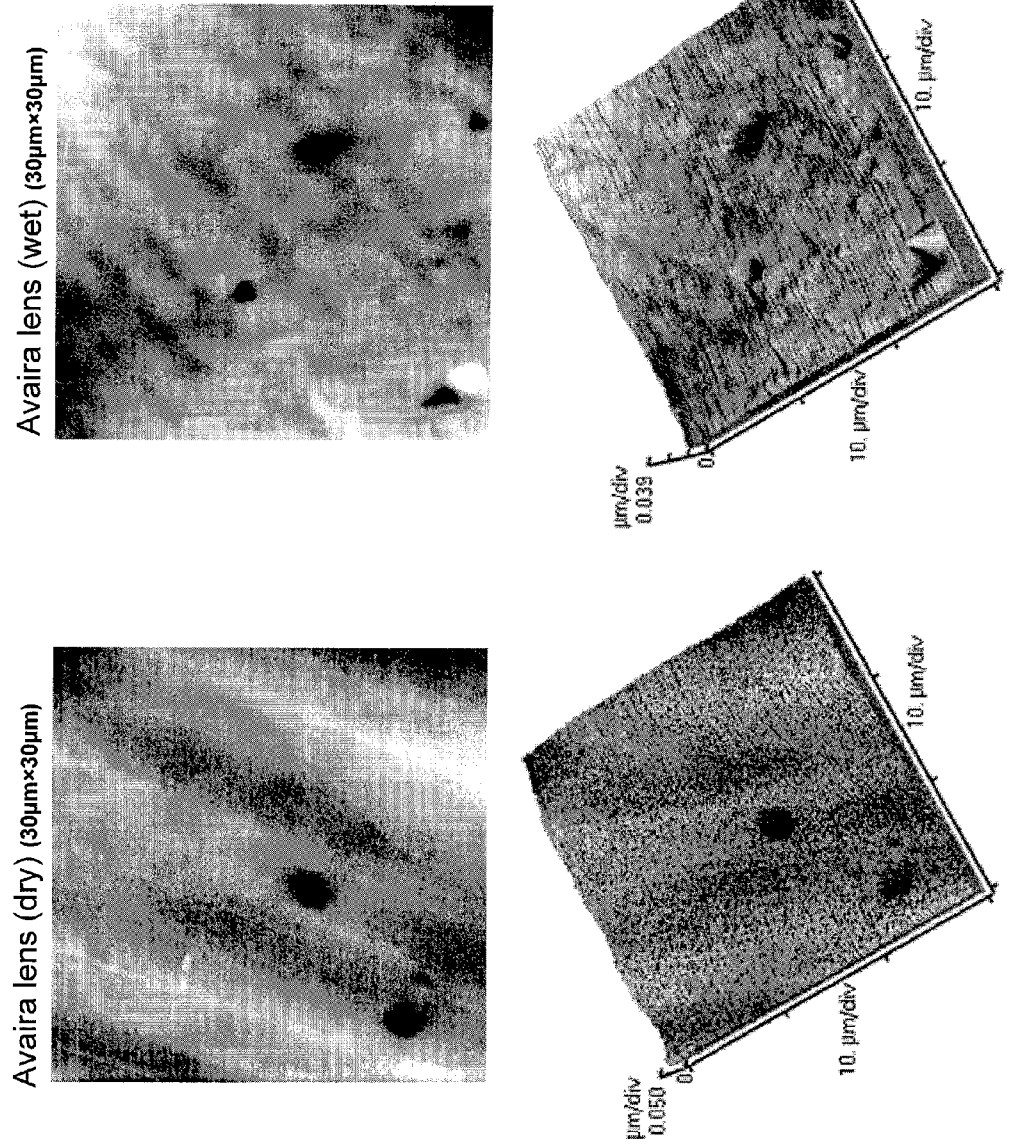

In FIGS. 16-18, tapping mode AFM results are presented for contact lenses from formulations 1, 5, 15 and the commercially available AVAIRA® lens tested in both the wet or hydrated stated (hydrated in PBS) and the dry state. These results show that the surface depressions are present in both the wet lenses and the dry lenses. Thus, the surface depressions do not result, for example, do not solely result, from hydration of the lenses.

A number of publications, patents and patent applications have been cited hereinabove. Each of these cited publications, patents and patent applications is hereby incorporated by reference in its entirety.

While this invention has been described with respect to various specific examples and embodiments, it is to be understood that the invention is not limited thereto and that it can be variously practiced within the scope of the following claims.

What is claimed is:

1. A method of manufacturing a silicone hydrogel contact lens, comprising:
forming a silicone hydrogel contact lens body having an anterior surface and a posterior surface, wherein, after hydration in water or an aqueous solution, at least one of the anterior surface and the posterior surface of the lens body when wet is substantially smooth and comprises a plurality of depressions extending inwardly into the lens body from the substantially smooth surface, the plurality of depressions having at least one of an average diameter between about 150 nanometers and less than 1500 nanometers and an average density from about 100 depressions per 900 $\mu m^2$ to about 1200 depressions per 900 $\mu m^2$, and wherein the lens body has not been subjected to a form of plasma treatment, the lens body has not been treated with a polymerizable swelling agent after the lens body is formed, or both, at least one of the anterior surface and the posterior surface of the lens body has an average surface roughness from about 5 nanometers RMS to about 30 nanometers RMS, and the lens body has a swell factor of at least 20%.

2. The method of claim 1, wherein the forming step comprises polymerizing a polymerizable composition comprising reactive ingredients comprising at least one silicone-containing monomer, at least one silicone-containing macromer, at least one silicone-containing prepolymer, or mixtures thereof; at least one hydrophilic monomer and at least one crosslinking agent effective to crosslink the reactive ingredients.

3. The method of claim 2, wherein the polymerizing step occurs at least partially in a contact lens mold comprising a non-polar material.

4. The method of claim 3, wherein the non-polar material comprises polypropylene.

5. The method of claim 3, wherein the non-polar material is a nucleated thermoplastic polypropylene resin.

6. The method of claim 2, wherein the reactive ingredients comprise a silicone-containing monomer with a molecular weight less than 700 Daltons.

7. The method of claim 2, wherein the reactive ingredients comprise a silicone-containing macromer with a molecular weight between about 700 Daltons and about 2,000 Daltons.

8. The method of claim 2, wherein the reactive ingredients comprise a silicone-containing prepolymer with a molecular weight greater than 2,000 Daltons.

9. The method of claim 1, wherein the forming step comprises polymerization of a polymerizable composition in the absence of a diluent.

10. The method of claim 1, wherein the lens body is not subjected to extraction with an organic solvent or an aqueous solution including an organic solvent component prior to hydration in the water or the aqueous solution.

11. The method of claim 1, wherein after hydration in water or an aqueous solution, the at least one of the anterior surface and the posterior surface of the lens body when wet comprises a plurality of depressions with an average diameter between about 150 nanometers and less than 1500 nanometers and an average density from about 100 depressions per 900 $\mu m^2$ to about 1200 depressions per 900 $\mu m^2$.

12. A silicone hydrogel contact lens, comprising:
a silicone hydrogel lens body comprising an anterior surface and a posterior surface, wherein, after hydration in water or an aqueous solution, at least one of the anterior surface and the posterior surface of the lens body when wet is substantially smooth and comprises a plurality of depressions extending inwardly into the lens body from the substantially smooth surface, the plurality of depressions having an average diameter between about 150 nanometers and less than 1500 nanometers, and wherein the lens body has not been subjected to a form of plasma treatment, the lens body has not been treated with a polymerizable swelling agent after the lens body is formed, or both, at least one of the anterior surface and the posterior surface of the lens body has an average surface roughness from about 5 nanometers RMS to about 30 nanometers RMS, and the lens body has a swell factor of at least 20%.

13. The contact lens of claim 12, wherein the plurality of depressions have an average diameter between about 130 nanometers and less than about 630 nanometers.

14. The contact lens of claim 12, wherein the plurality of depressions have an average depth from about 4 nanometers to about 100 nanometers.

15. The contact lens of claim 12, wherein the plurality of depressions have an average density from about 5 depressions per 900 $\mu m^2$ to about 1500 depressions per 900 $\mu m^2$.

16. The contact lens of claim 12, wherein, at least 12 hours after hydration in the water or the aqueous solution, the at least one of the anterior surface and the posterior surface of the lens body has an advancing contact angle of less than 100° and a water break up time of greater than five seconds.

17. The contact lens of claim 12, wherein the lens body is fully or partially cured while in direct contact with a contact lens mold comprising a non-polar material.

18. The contact lens of claim 12, wherein the lens body comprises a reaction product of a polymerizable composition comprising:
reactive ingredients comprising at least one silicone-containing monomer, at least one silicone-containing macromer, at least one silicone-containing prepolymer, or mixtures thereof,
at least one hydrophilic monomer, and
at least one crosslinking agent that crosslinks the reactive ingredients during polymerization to form a polymer.

19. A silicone hydrogel contact lens, comprising:

a non-plasma treated silicone hydrogel lens body comprising an anterior surface and a posterior surface, at least one of the anterior surface and the posterior surface being substantially smooth and comprising a plurality of depressions extending inwardly into the lens body from the substantially smooth surface, the plurality of depressions having an average density from about 100 depressions per 900 µm$^2$ to about 1200 depressions per 900 µm$^2$, at least one of the anterior surface and the posterior surface of the lens body has an average surface roughness from about 5 nanometers RMS to about 30 nanometers RMS, and the lens body has a swell factor of at least 20%.

* * * * *